(12) United States Patent
Kim et al.

(10) Patent No.: US 10,798,695 B2
(45) Date of Patent: Oct. 6, 2020

(54) METHOD FOR TRANSMITTING AND RECEIVING SYNCHRONIZATION SIGNAL IN WIRELESS COMMUNICATION SYSTEM, AND APPARATUS THEREFOR

(71) Applicant: LG ELECTRONICS INC., Seoul (KR)

(72) Inventors: Kyuseok Kim, Seoul (KR); Kilborn Lee, Seoul (KR); Kijun Kim, Seoul (KR); Minki Ahn, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 16/309,896

(22) PCT Filed: Feb. 8, 2017

(86) PCT No.: PCT/KR2017/001377
§ 371 (c)(1),
(2) Date: Dec. 13, 2018

(87) PCT Pub. No.: WO2017/217636
PCT Pub. Date: Dec. 21, 2017

(65) Prior Publication Data
US 2019/0335426 A1    Oct. 31, 2019

Related U.S. Application Data

(60) Provisional application No. 62/349,131, filed on Jun. 13, 2016.

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/005* (2013.01); *H04L 5/0026* (2013.01);
(Continued)

(58) Field of Classification Search
CPC . H04W 72/042; H04W 48/08; H04W 56/001; H04W 72/02; H04W 72/0446;
(Continued)

(56) References Cited

U.S. PATENT DOCUMENTS

2010/0118839 A1    5/2010    Malladi et al.
2016/0157267 A1    6/2016    Frenne et al.
(Continued)

FOREIGN PATENT DOCUMENTS

WO    2015115776    8/2015

OTHER PUBLICATIONS

PCT International Application No. PCT/KR2017/001377, International Search Report dated May 22, 2017, 3 pages.
(Continued)

*Primary Examiner* — Paul H Masur
*Assistant Examiner* — Michael K Phillips
(74) *Attorney, Agent, or Firm* — Lee Hong Degerman Kang Waimey

(57) ABSTRACT

Disclosed in the present specification is a method by which a terminal transmits and receives a synchronization signal in a wireless communication system, comprising the steps of: receiving, from a base station, a synchronization signal and an extended synchronization signal, which are repeatedly transmitted a predetermined number of times for each beam; acquiring time and frequency synchronization with the base station on the basis of the received synchronization signal
(Continued)

and the received extended synchronization signal; and receiving a beam reference signal related to beam selection from the base station.

18 Claims, 13 Drawing Sheets

(51) Int. Cl.
*H04W 48/08* (2009.01)
*H04W 56/00* (2009.01)
*H04W 72/02* (2009.01)

(52) U.S. Cl.
CPC ........... *H04L 5/0032* (2013.01); *H04W 48/08* (2013.01); *H04W 56/001* (2013.01); *H04W 72/02* (2013.01)

(58) Field of Classification Search
CPC .... H04W 16/28; H04L 5/0026; H04L 5/0032; H04L 5/005; H04L 5/0048; H04L 27/2656; H04L 27/2675; H04B 7/0695; H04B 7/088; H04B 7/0408
See application file for complete search history.

(56) References Cited

U.S. PATENT DOCUMENTS

| | | | |
|---|---|---|---|
| 2017/0094624 A1* | 3/2017 | Balachandran | H04L 5/006 |
| 2017/0279553 A1* | 9/2017 | Sadiq | H04J 11/0069 |
| 2017/0303263 A1* | 10/2017 | Islam | H04B 7/0408 |
| 2017/0318559 A1* | 11/2017 | Islam | H04W 72/0453 |
| 2017/0325260 A1* | 11/2017 | Guo | H04L 27/2602 |
| 2017/0353257 A1* | 12/2017 | Islam | H04J 3/0617 |
| 2018/0007679 A1* | 1/2018 | Lee | H04W 72/048 |
| 2019/0199570 A1* | 6/2019 | Islam | H04L 27/2666 |
| 2019/0281563 A1* | 9/2019 | Lee | H04L 5/00 |

OTHER PUBLICATIONS

Samsung, "Analog/digital/hybrid beamforming for massive MIMO", 3GPP TSG RAN WG1 Meeting #85, R1-164018, May 2016, 6 pages.

ETRI, "Initial views on MIMO/Beamforming in the NR systems", 3GPP TSG RAN WG1 Meeting #85, R1-164872, May 2016, 6 pages.

* cited by examiner

METHOD FOR TRANSMITTING AND RECEIVING SYNCHRONIZATION SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/001377, filed on Feb. 8, 2017, which claims the benefit of U.S. Provisional Application No. 62/349,131, filed on Jun. 13, 2016, the contents of which are all hereby incorporated by reference herein in their entirety.

TECHNICAL FIELD

The present disclosure relates to a wireless communication system and, more specifically, to a method for transmitting and receiving a synchronization signal in a wireless communication system, and an apparatus therefor.

BACKGROUND ART

A mobile communication system has been developed to provide a voice service, while guaranteeing activity of users. However, coverage of a mobile communication system has extended up to a data service, as well as the voice service, and currently, an explosive increase in traffic has caused shortage of resources, and since users expect relatively high speed services, an advanced mobile communication system is required.

Requirements of a next-generation mobile communication system include accommodation of explosive data traffic, a remarkable increase in a transfer rate per use, accommodation of considerably increased number of connection devices, very low end-to-end latency, and high energy efficiency. To this end, various technologies such as dual connectivity, massive multiple input multiple output (MIMO), in-band full duplex, non-orthogonal multiple access (NOMA), super wideband, and device networking have been researched.

DISCLOSURE

Technical Problem

An object of the present disclosure is to define a structure of an extended synchronization signal used in an mmWave cellular system supporting high-frequency bands.

In addition, an object of the present disclosure is to provide a method for generating extended synchronization signal sequences using at least one of a scrambling code and an orthogonal cover code.

Furthermore, an object of the present disclosure is to provide a method of using information such as a beam period, the number of BRS ports and a physical cell ID to determine a scrambling code or an orthogonal cover code applied to generation of an extended synchronization signal.

It will be appreciated by persons skilled in the art that the objects that could be achieved with the present disclosure are not limited to what has been particularly described hereinabove and the above and other objects that the present invention could achieve will be more clearly understood from the following detailed description.

Technical Solution

In the present disclosure, a method by which a terminal transmits and receives a synchronization signal in a wireless communication system includes: receiving, from a base station, a synchronization signal and an extended synchronization signal which are repeatedly transmitted a predetermined number of times for each beam, the synchronization signal including a primary synchronization signal (PSS) and a secondary synchronization signal, the extended synchronization signal including positional information of a symbol in a subframe; acquiring time and frequency synchronization with the base station on the basis of the received synchronization signal and extended synchronization signal; and receiving a beam reference signal related to beam selection from the base station.

Further, in the present disclosure, sequences of the extended synchronization signal may be generated using at least one of a scrambling code generated on the basis of a pseudo-random sequence and an orthogonal cover code (OCC).

Further, in the present disclosure, the pseudo-random sequence may be generated from a length-31 Gold sequence.

Further, in the present disclosure, the scrambling code or the OCC may be determined on the basis of at least one of a physical cell identifier (PCI), a beam period and the number of ports of a BRS.

Further, in the present disclosure, the sequences of the extended synchronization signal may include a first extended synchronization signal sequence and a second extended synchronization signal sequence, and the first extended synchronization signal sequence and the second extended synchronization signal sequence may be determined differently.

Further, in the present disclosure, the first extended synchronization signal sequence may be an odd-numbered sequence of the sequences of the extended synchronization signal and the second extended synchronization signal sequence may be an even-numbered sequence of the sequences of the extended synchronization signal.

Further, in the present disclosure, the synchronization signal and the extended synchronization signal may be transmitted through two subframes in one radio frame and transmitted in all symbols of each subframe.

Further, in the present disclosure, the two subframes in one radio frame may be a first subframe of a first slot and a first subframe of a second slot.

Further, in the present disclosure, the BRS may be transmitted on the basis of a beam period.

Further, in the present disclosure, the subframe may be 0.2 ms.

Further, the present disclosure further including receiving, from the base station, beam related information of a neighboring cell necessary for neighboring cell search through a serving cell.

Further, in the present disclosure, the beam related information may include beam period information, wherein the beam period information of the neighboring cell is set to an offset from a beam period of the serving cell or set to a value directly indicating a beam period of the neighboring cell.

Further, in the present disclosure, periods for beams of the serving cell or the neighboring cell may be identical to each other in the case of periodic synchronization signal transmission and different from each other in the case of data transmission.

Further, in the present disclosure, the method may further including receiving beam related information of a neighboring cell which is necessary for neighboring cell search from the base station through a serving cell.

Further, in the present disclosure, a terminal for transmitting and receiving a synchronization signal in a wireless communication system includes: a radio frequency (RF) unit for transmitting and receiving RF signals; and a processor for controlling the RF unit, wherein the processor is configured: to receive, from a base station, a synchronization signal and an extended synchronization signal which are repeatedly transmitted a predetermined number of times for each beam, the synchronization signal including a primary synchronization signal (PSS) and a secondary synchronization signal, the extended synchronization signal including positional information of a symbol in a subframe; to acquire time and frequency synchronization with the base station on the basis of the received synchronization signal and extended synchronization signal; and to receive a beam reference signal related to beam selection from the base station.

Advantageous Effects

The present disclosure has the advantage of securing synchronization with a symbol timing by using an extended synchronization signal in a high-frequency cellular system.

In addition, the present disclosure has the advantage of additionally notifying a terminal of beam related information through extended synchronization signal transmission.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Figure 1:
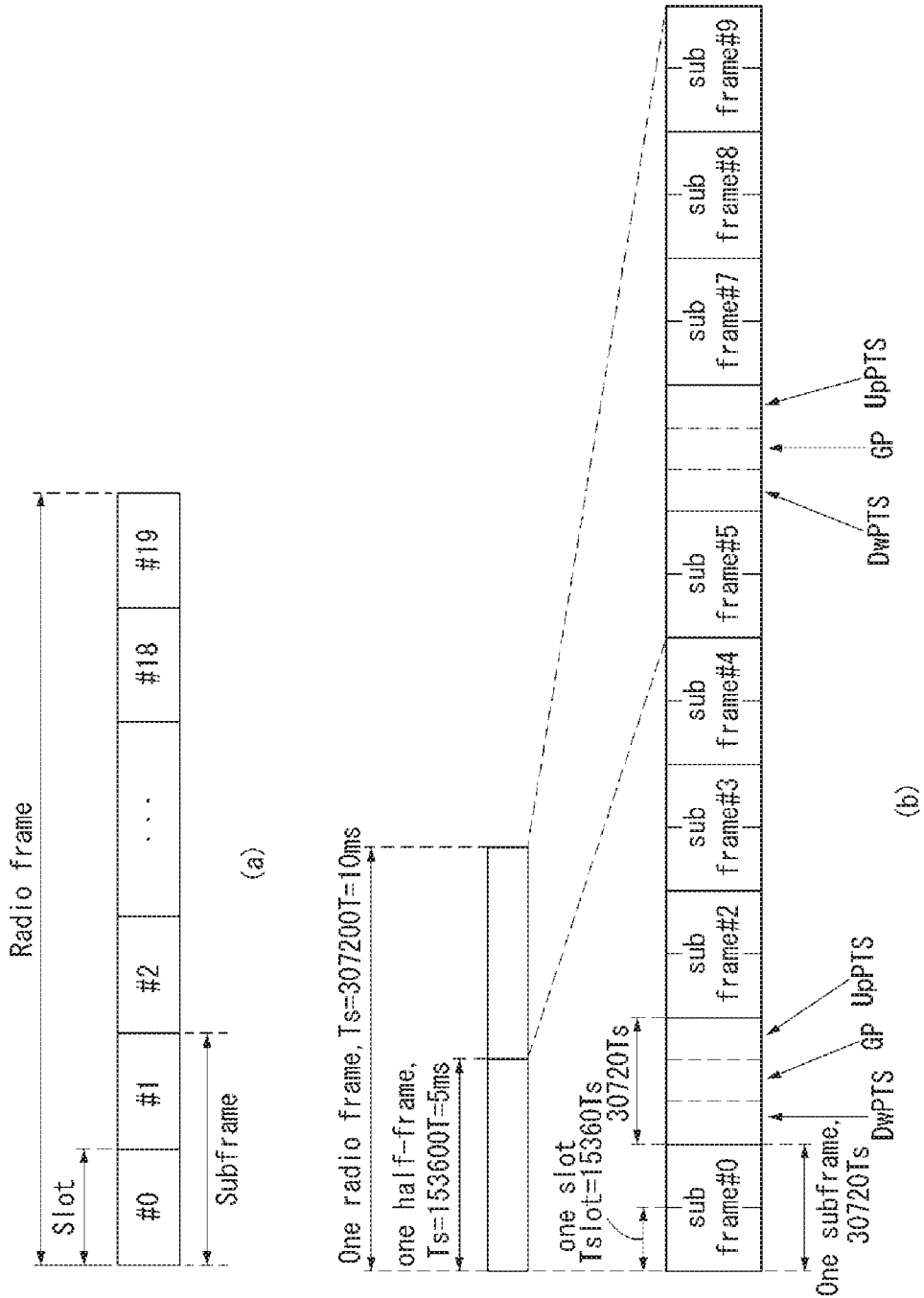
FIG. 1 shows a structure of a radio frame in a wireless communication system to which the present invention is applicable.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General Wireless Communication System to which an Embodiment of the Present Invention May be Applied FIG. 1 shows the structure of a radio frame in a wireless communication system to which an embodiment of the present invention may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "$T\_s=1/(15000*2048)$." Downlink and uplink transmission includes a radio frame having an interval of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot $2i$ and a slot $2i+1$. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*Ts=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot $2i$ and the slot $2i+1$ each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

Figure 2:
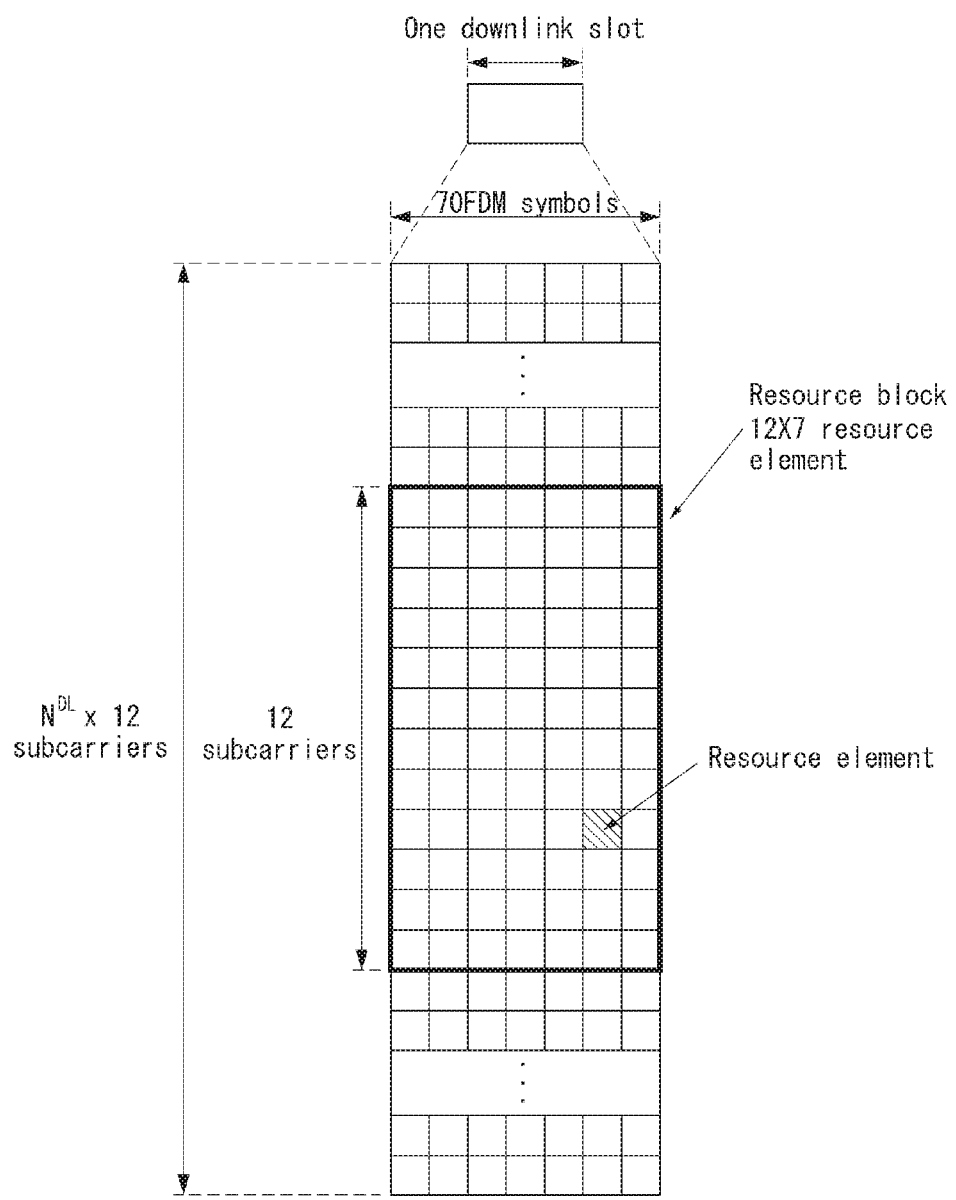
FIG. 2 is a diagram illustrating a resource grid for one downlink slot in a wireless communication system to which the present invention is applicable.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
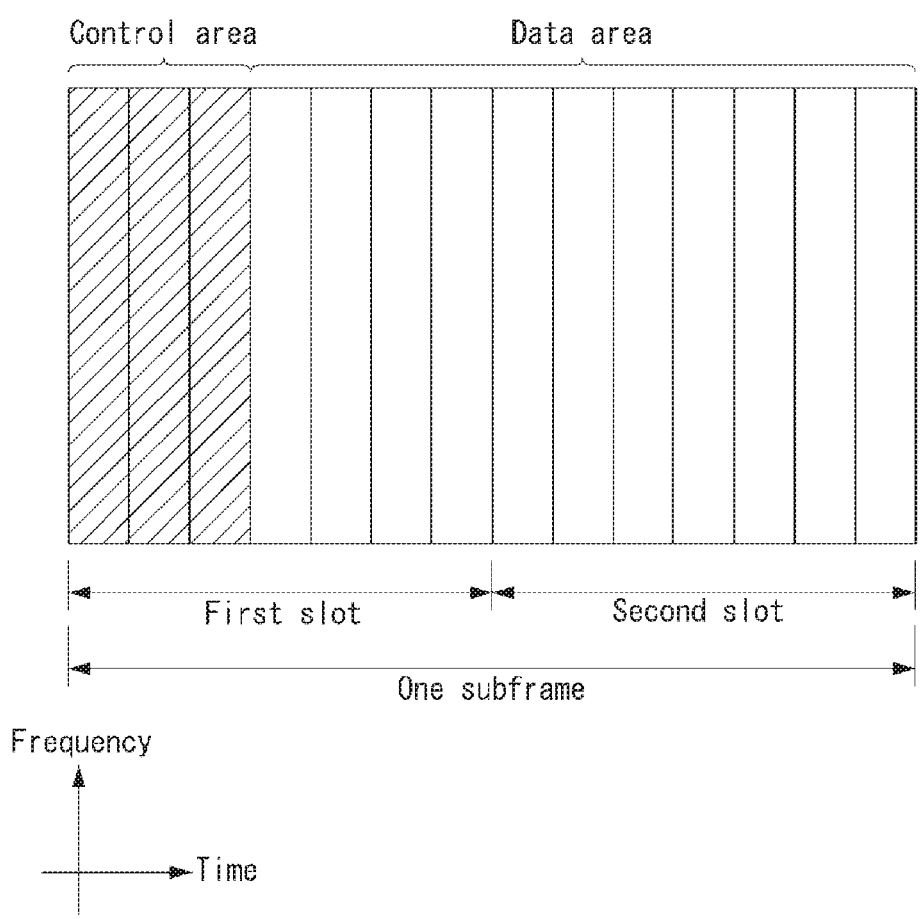
FIG. 3 shows a structure of a downlink subframe in a wireless communication system to which the present invention is applicable.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
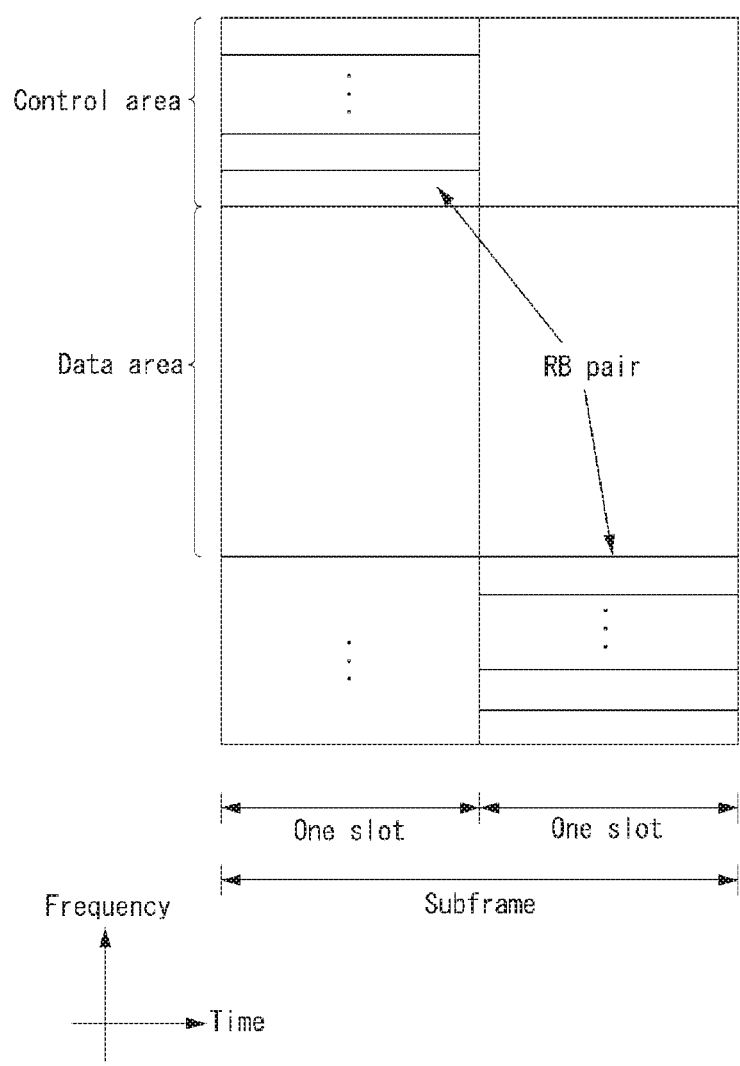
FIG. 4 shows a structure of an uplink subframe in a wireless communication system to which the present invention is applicable.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Synchronization Signal/Sequence (SS) in LTE System

Figure 5:
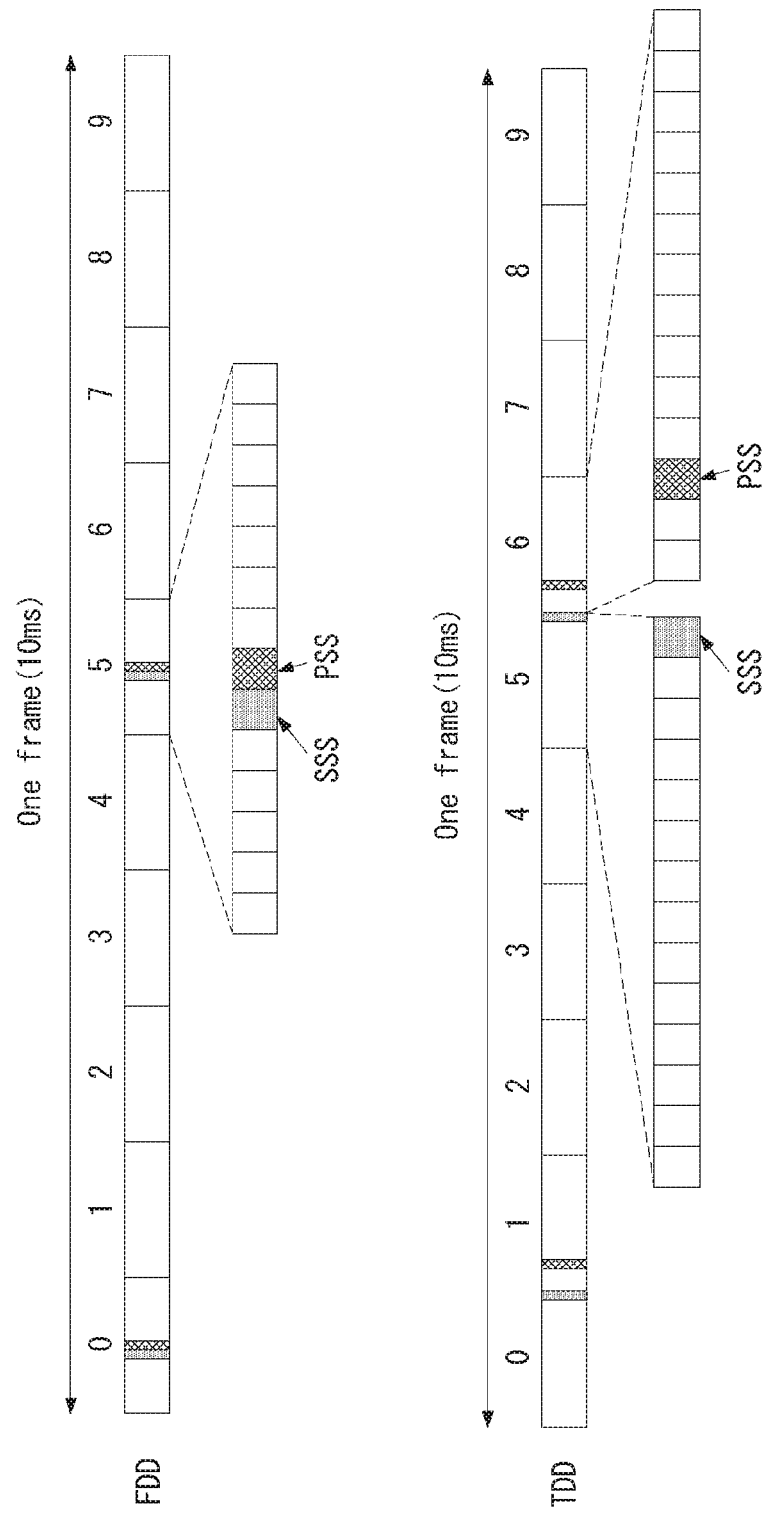
FIG. 5 is a diagram showing examples of synchronization signal positions in an LTE system.

To aid in cell search of a terminal, two special signals such as a primary synchronization signal (PSS) and a secondary synchronization signal (SSS) are transmitted through each downlink component carrier of an LTE system from a base station to the terminal. As shown in FIG. 5, the positions of synchronization signals PSS and SSS in the time domain in a frame depend on whether a cell operates in FDD or TDD.

FIG. 5 is a diagram showing examples of positions of synchronization signals in the LTE system.

Referring to FIG. 5, a PSS is transmitted in the last symbols of the first slots of subframes #0 and #5 and an SSS is transmitted in the penultimate symbols of the same slots in the case of FDD.

In the case of TDD, a PSS is transmitted in the third symbols of subframes #1 and #6 and an SSS is transmitted in the last symbols of subframes #0 and #5.

PSSs transmitted twice in one frame in a specific (or one) cell are identical to each other.

Further, a PSS in a specific (or one) cell may have three different values according to physical cell ID (PCI).

More specifically, three cell IDs in one cell ID group correspond to different PSSs.

Accordingly, when a terminal detects and checks a PSS, the terminal recognizes the following information.

5 ms timing of a cell

Accordingly, the terminal also recognizes the position of an SSS ahead of the PSS by a fixed offset.

Cell IDs in cell ID groups

However, the terminal does not know cell ID groups and thus the number of available cell IDs is reduced from 504 to 168.

Next, the terminal recognizes the following information by detecting an SSS.

Frame timing

Cell ID groups

For example, when the terminal searches cells on other carriers, a search window may not be large enough to check two or more SSSs and thus the terminal needs to know the aforementioned information only by receiving only one SSS.

To this end, each SSS has 168 different values corresponding to 168 different cell ID groups.

Further, values for two SSS in one frame are different from each other.

Accordingly, the terminal can recognize whether SSS1 or SSS2 has been detected by detecting one SSS and thus can recognize frame timing.

When the terminal acquires frame timing and a physical cell ID through a PSS and an SSS, the terminal recognizes a corresponding cell-specific reference signal (RS).

A subsequent operation using the cell-specific reference signal depends on whether initial cell search is performed by an RRC_IDLE mode terminal or cell search is performed for neighboring cell measurement.

In the case of initial cell search, that is, a terminal is in the RRC_IDLE mode, the reference signal is used for channel estimation and subsequent decoding of a BCH transmission channel to acquire the most fundamental part of system information.

On the other hand, in the case of measurement for mobility, that is, a terminal is in the RRC_CONNECTED mode, the terminal measures reference signal received power.

If a measurement value with respect to the RS satisfies set conditions, the terminal transmits a reference signal received power (RSRP) measurement report to a network.

The network determines whether to perform handover on the basis of the measurement report.

Hereinafter, the aforementioned synchronization signals in the LTE system will be described in more detail with reference to FIGS. 6 to 8.

As described above, SS includes a primary (P) SS and a secondary (S) SS and corresponds to a signal used when cell search is performed.

Figure 6:
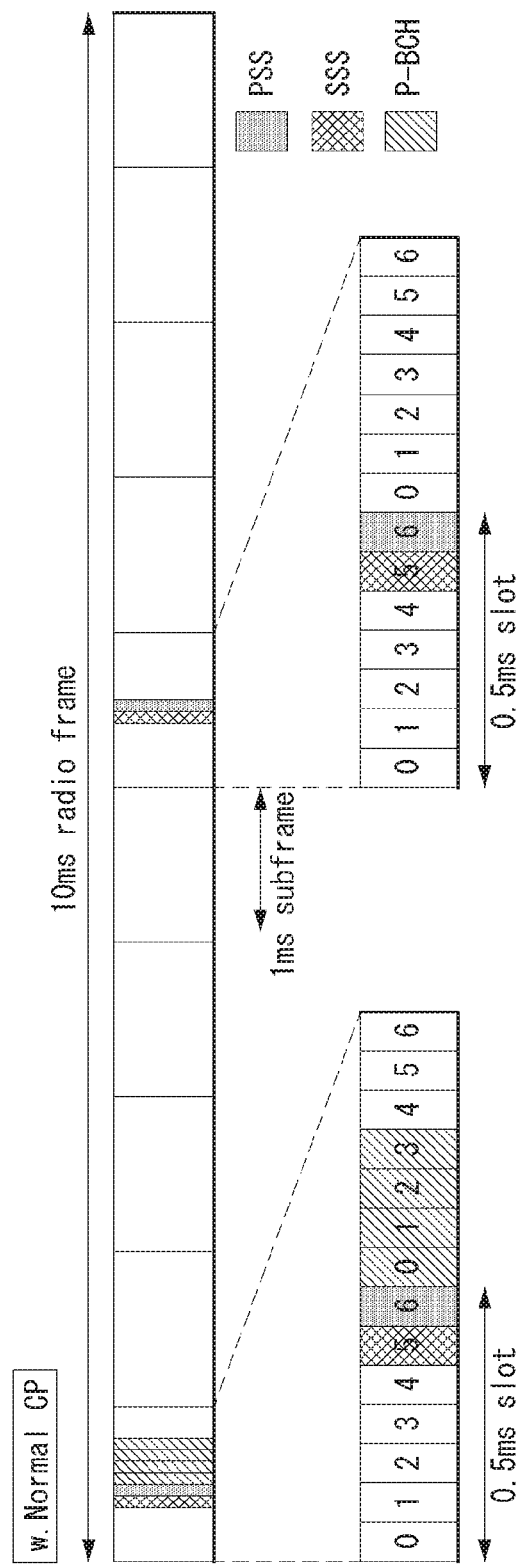
FIG. 6 is a diagram illustrating a frame structure used for SS transmission in a system using a normal cyclic prefix (CP).
Figure 7:
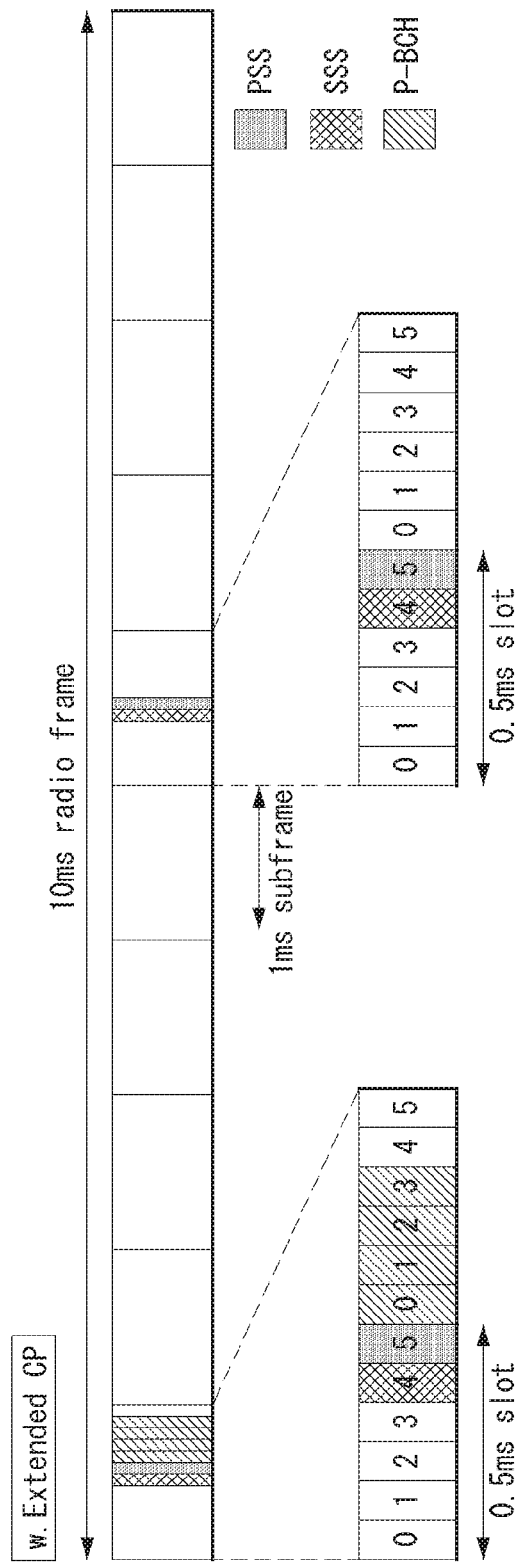
FIG. 7 is a diagram illustrating a frame structure used for SS transmission in a system using an extended CP.

FIG. 6 is a diagram illustrating a frame structure used for SS transmission in a system using a normal cyclic prefix (CP). FIG. 7 is a diagram illustrating a frame structure used for SS transmission in a system using an extended CP.

SSs are transmitted in the second slots of subframes #0 and #5 in consideration of 4.6 ms which is the GSM (Global System for Mobile communications) frame length for facilitation of inter-RAT (Radio Access Technology) measurement, and the boundary of the corresponding radio frame can be detected through an S-SS. A P-SS is transmitted in the last OFDM symbols of corresponding slots and the S-SS is transmitted in an OFDM symbol immediately before the P-SS.

SSs can carry a total of 504 physical cell IDs through a combination of 3 P-SS and 168 S-SSs. In addition, SSs and PBCHs are transmitted in 6 RBs at the center of a system bandwidth and thus can be detected or decoded by a terminal irrespective of transmission bandwidth.

An SS transmission diversity method uses only a single antenna port and is not separately defined in the standards. That is, the SS transmission diversity method can use a single antenna transmission or terminal transparent transmission method (e.g., PVS (Precoder Vector Switching), TSTD (Time-Switched Transmit Diversity) and CDD (Cyclic-Delay Diversity)).

1. P-SS Code

A length-63 ZC (Zadoff-Chu) sequence can be defined in the frequency domain and used as a P-SS sequence. A ZC sequence is defined by Equation 12 and sequence element n=31 corresponding to a DC subcarrier is punctured. N_zc=63 in Equation 1.

$$d_u(n) = e^{-j\frac{\pi u n(n+1)}{N_{ZC}}} \qquad \text{[Equation 1]}$$

9 remaining subcarriers among 6 RB (=7 subcarriers) located at the center of a frequency region are transmitted as the value of 0 all the time and facilitates filter design for performing synchronization. To define a total of 3 P-SSs, u=25, 29 and 34 can be used in Equation 1. Here, 29 and 34 has a conjugate symmetry relationship therebetween and thus two correlations can be simultaneously performed. Here, conjugate symmetry refers to Equation 2 and a oneshot correlator for u=29 and 34 can be realized using this characteristic, reducing the amount of computations about 33.3%.

$$d_u(n)=(-1)^n(d_{N_{2C}-u}(n))^*, \text{when } N_{2C} \text{ is even number.}$$

$$d_u(n)=(d_{N_{2C}-u}(n))^*, \text{when } N_{2C} \text{ is odd number.} \quad [\text{Equation 2}]$$

2. S-SS Code

A sequence used for an S-SS is obtained by interleaving two length-31 m-sequences, and two sequences are combined to transmit 168 cell group IDs. An m-sequence as an S-SS sequence is robust against frequency selective environments and can reduce the amount of computations through fast m-sequence transformation using fast Hadamard transform. Further, configuration of an S-SS using two short codes has been proposed in order to reduce the amount of computations of a terminal.

Figure 8:
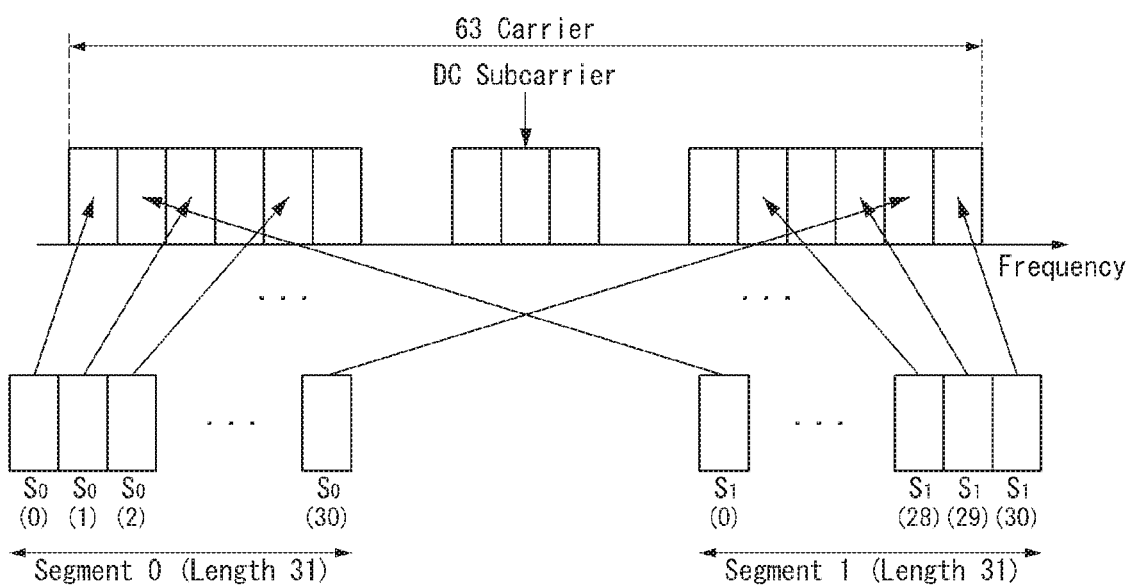
FIG. 8 is a diagram showing that two sequences in a logical region are interleaved and mapped in a physical region.

FIG. 8 is a diagram showing that two sequences in a logical region are interleaved and mapped in a physical region.

Referring to FIG. 8, when two m-sequences used for S-SS code generation are defined as S1 and S2, if an S-SS of subframe #0 carries a cell group ID through a combination of (S1, S2), an S-SS of subframe #5 swaps the combination with (S2, S1) and carries a cell group ID to define a 10 ms frame boundary. Here, S-SS code uses a generator polynomial of $x^5+x^2+1$ and a total of 31 codes can be generated through different circular shifts.

To improve reception performance, two different P-SS-based sequences can be defined and scrambled into S-SSs and S1 and S2 can be scrambled into different sequences. Then, S1-based scrambling code can be defined and scrambled into S2. Here, S-SS code is swapped in units of 5 ms but P-SS based scrambling code is not swapped. A P-SS based scrambling code is defined as 6 circular shift versions according to P-SS index in an m-sequence generated from the generator polynomial of $x^5+x^2+1$ and an S1 based scrambling code is defined as 8 circular shift versions according to S1 index in an m-sequence generated from a polynomial of $x^5+x^4\pm x^2+x^1+1$.

Asynchronous standards of the LTE system are described in the following.

A terminal can monitor downlink quality on the basis of a cell-specific reference signal in order to detect downlink radio link quality of a PCell.

A terminal can estimate downlink radio link quality for the purpose of monitoring the downlink radio link quality of a PCell and compare the downlink radio link quality with thresholds Q_out and Q_in.

The threshold Q_out can be defined as a level at which a downlink radio link is not securely received and correspond to 10% block error rate of PDCCH transmission of a hypothesis considering a PCFICH along with transmission parameters.

The threshold Q_in can be defined as a downlink radio link quality level which is high and can be received more securely than Q_out and correspond to 2% block error rate of PDCCH transmission of a hypothesis considering a PCFICH along with transmission parameters.

Hereinafter, a method for indicating beam related information such as a beam period and the number of beam reference signal (BRS) ports using a configuration of an extended synchronization signal (ESS) used at a high frequency of 6 GHs or higher proposed in the present disclosure will be described.

Specifically, the present disclosure proposes a method for generating an ESS on the basis of a scrambling code and/or an orthogonal cover code (OCC) to indicate beam related information.

Extended Synchronization Signal: ESS

First, an ESS will be described.

Compared to bands of 6 GHz or lower which are bands of conventional cellular communication systems, high-frequency bands of 6 GHz or higher have very high pathloss and thus a beamforming technique is necessary in order to compensate for the pathloss.

In addition, high-frequency bands have the advantage that a large number of antennas can be installed by decreasing an antenna spacing.

However, a digital beamforming technique that processes all antenna signals through a baseband process requires very high hardware complexity.

Accordingly, a hybrid beamforming technique that uses an analog beamforming technique along with the digital beamforming technique such that the advantage of the digital beamforming technique can be taken while reducing hardware complexity is considered.

In this case, however, resources available at the same time may be limited due to the analog beamforming technique.

Synchronization signals are also transmitted based on a beamforming technique in order to compensate for pathloss and thus transmitted through different beams with directions thereof varying within the coverage of a base station.

Figure 9:
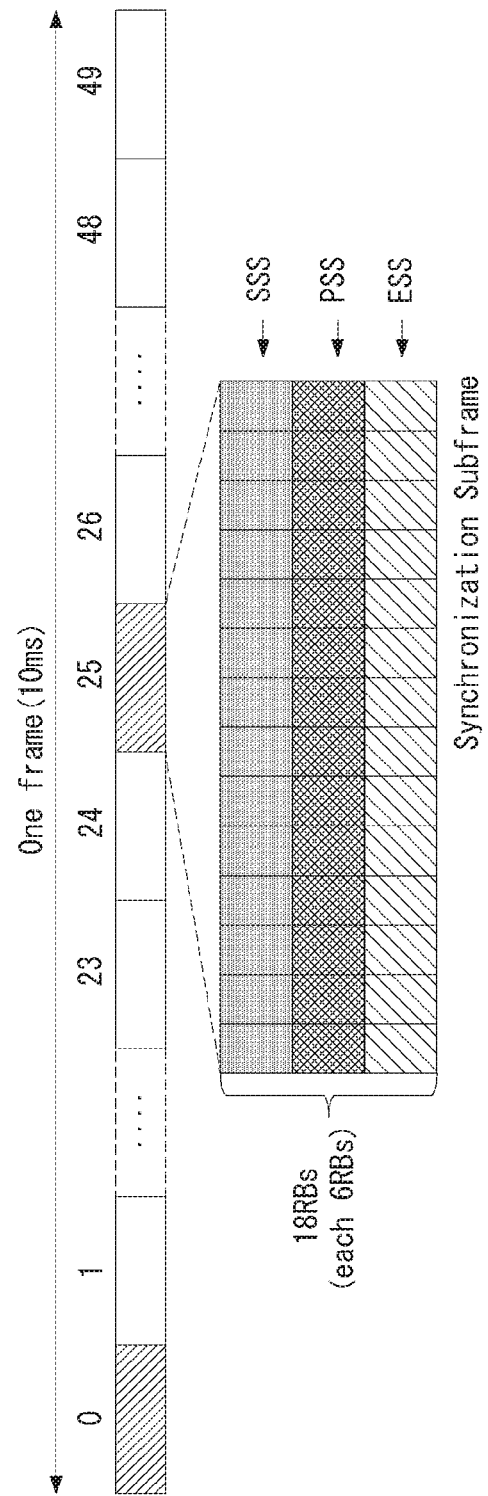
FIG. 9 shows an example of a synchronization signal configuration of a high-frequency cellular system to which methods proposed in the present disclosure is applicable.

FIG. 9 shows an example of a synchronization signal configuration of a high-frequency cellular system to which methods proposed in the present disclosure is applicable.

That is, FIG. 9 shows an example of a synchronization signal of an mmWave cellular system.

Referring to FIG. 9, one radio frame (10 ms) includes 50 subframes (0.2 ms) and a synchronization signal is transmitted in the first subframe (SF #0) and the twenty-sixth subframes (SF #25).

SF #0 and SF #25 can respectively correspond to the first subframe of the first slot and the first subframe of the second slot.

That is, one radio frame can include two slots each of which includes 25 subframes.

In addition, an SSS, a PSS and an ESS are transmitted in SF #0 and SF #25, and the SSS, PSS and ESS are transmitted in all symbols of each subframe.

Further, each of the SSS, PSS and ESS uses resources of 6 resource blocks (RBs).

A base station transmits three synchronization signals PSS, SSS and ESS per beam to a terminal while changing beam directions within a synchronization subframe.

The terminal can acquire initial synchronization and a cell ID using the PSS and SSS that are synchronization signals of the legacy LTE system.

However, ambiguity with respect to symbol timing of synchronization signals detected from the synchronization subframe is present.

The ambiguity problem can be solved using an ESS.

Since the ESS includes information about a symbol position in a subframe, the terminal can detect symbol timing by detecting the ESS transmitted from the base station, as shown in the example of FIG. 9.

Repeated Transmission of Synchronization Signal

A repeated transmission method can be used as a method for compensating for high pathloss in the mmWave cellular system.

When it can be assumed that radio channels are similar between two received signals, SNR gain corresponding to the number of repetitions can be obtained through coherent combining.

Further, even when it cannot be assumed that radio channels are similar between two received signals, performance improvement can be achieved through non-coherent combining (power accumulation).

Since synchronization signals need to be received and detected even in poor channel environments, the repeated transmission method can be considered for performance improvement.

Figure 10:
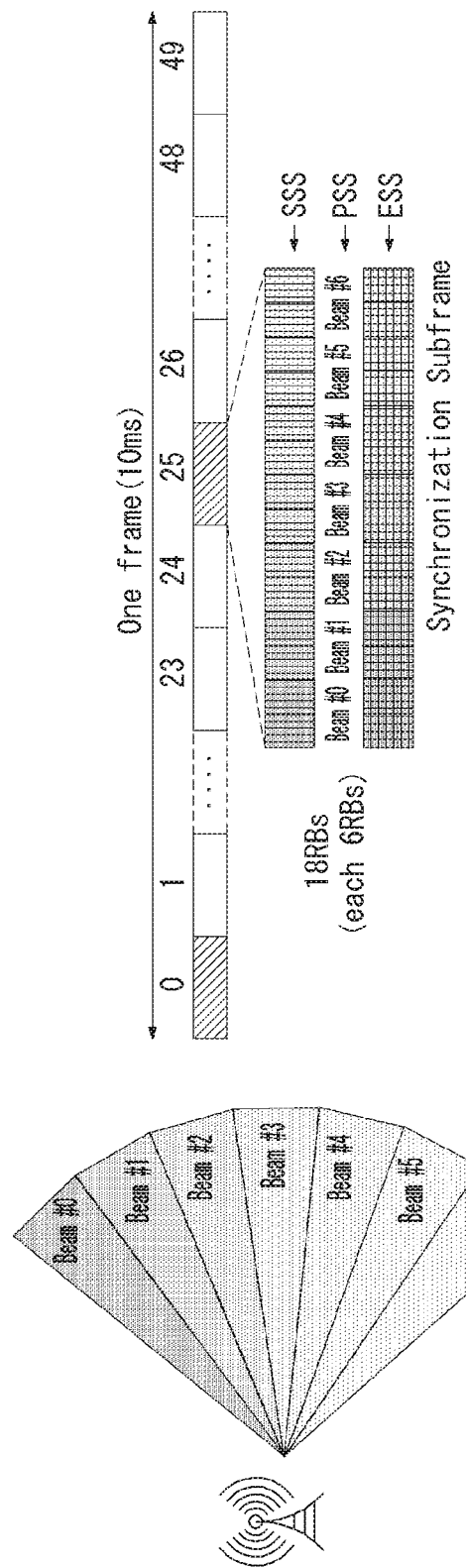
FIG. 10 is a diagram showing an example of repeated transmission of a synchronization signal to which methods proposed in the present disclosure is applicable.

FIG. 10 is a diagram showing an example of repeated transmission of a synchronization signal to which methods proposed in the present disclosure is applicable.

That is, FIG. 10 shows an example of repeated transmission in which a synchronization signal is repeatedly transmitted twice using the same beam.

Referring to FIG. 10, each of synchronization signals SSS, PSS and ESS is transmitted twice per beam through two symbols.

BRS (Beam Reference Signal) and Beam Period

To acquire downlink synchronization between a terminal and a base station using a PSS, an SSS and an ESS and then select an optimal beam, a beam reference signal (BRS) is used.

Figure 11:
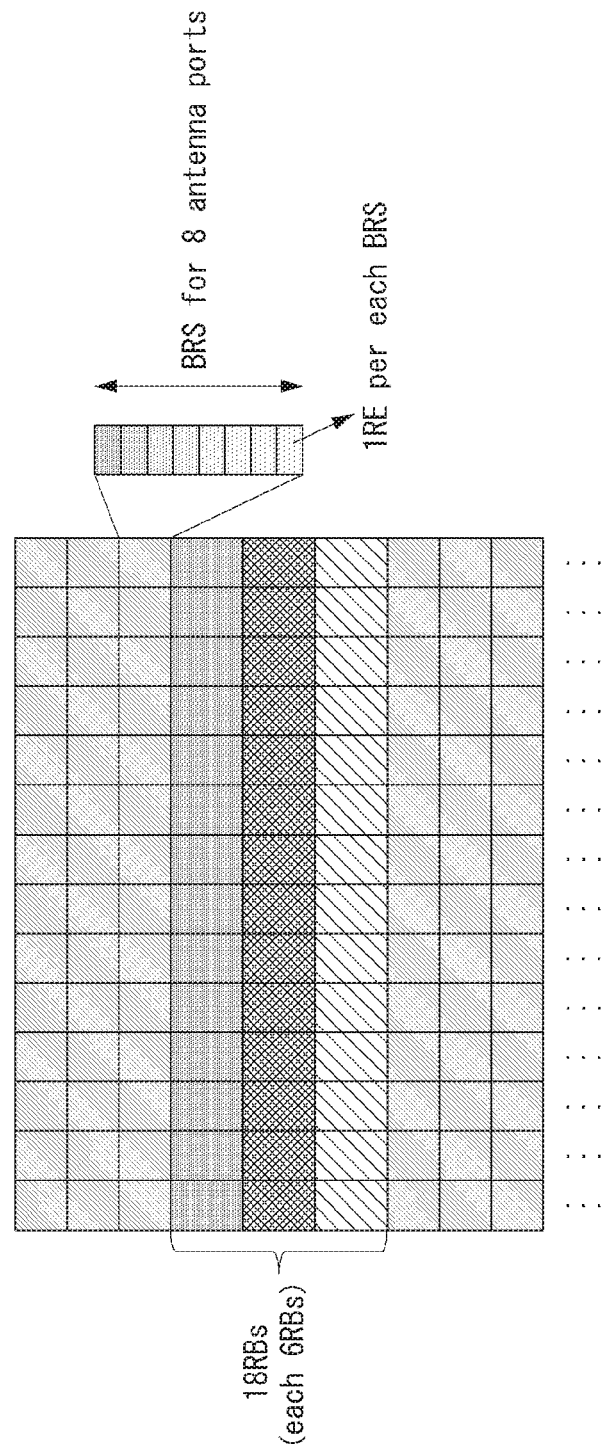
FIG. 11 is a diagram showing an example of BRS mapping of a base station having 8 antenna ports to which methods proposed in the present disclosure is applicable.

As shown in FIG. 11, synchronization signals occupy a relatively narrow band on the basis of a center frequency, whereas the BRS occupies the entire system band of the base station.

Accordingly, when the BRS is used, optimal beam search can be performed on the basis of a broadband channel.

FIG. 11 is a diagram showing an example of BRS mapping of a base station having 8 antenna ports to which methods proposed in the present disclosure is applicable.

Figure 12:
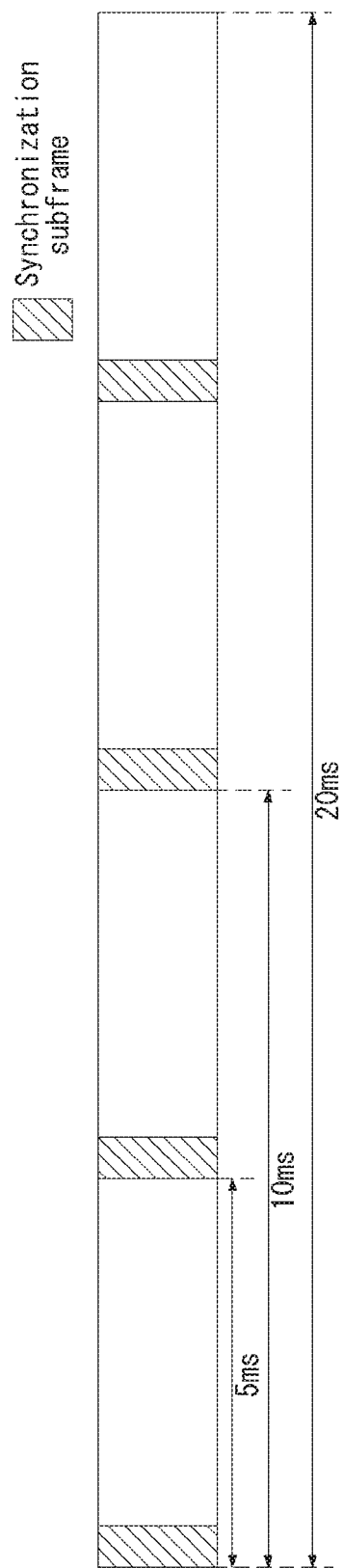
FIG. 12 is a diagram showing an example of a beam period to which methods proposed in the present disclosure is applicable.

FIG. 12 is a diagram showing an example of a beam period to which methods proposed in the present disclosure is applicable.

A base station can set a period in which all beams are scanned differently depending on the entire coverage, the number of beams, the number of antenna ports.

That is, the base station can set a BRS transmission period differently.

A period in which all beams of a base station are scanned or a period in which the same BRS is transmitted is defined as a "beam period".

Referring to FIG. 12, a beam period is set to 5 ms, 10 ms, 15 ms and 20 ms.

Table 3 shows an example of abeam period configuration.

TABLE 3

| Beam period configuration | # of subframes | Beam period | Maximum Number of beam scanning |
|---|---|---|---|
| 00 | ½ subframe | 5 ms or <5 ms | $N_p \times N_{sym}$ |
| 01 | 1 subframe | 5 ms | $2 \times N_p \times N_{sym}$ |
| 10 | 2 subframes | 10 ms | $4 \times N_p \times N_{sym}$ |
| 11 | 4 subframes | 20 ms | $8 \times N_p \times N_{sym}$ |

In Table 3, $N_p$ and $N_{sym}$ represent the number of BRS ports and the number of OFDM symbols within one slot, respectively.

ESS Sequence

When an ESS sequence is designed, the ESS sequence is designed such that symbol timing detection which is the fundamental purpose of the ESS can be achieved.

Accordingly, a Zadoff-chu (ZC) sequence or an orthogonal sequence such as a DFT sequence can be used as an ESS sequence.

The following equation 3 shows an example of generating an ESS sequence $\tilde{r}_l(k)$ using a ZC sequence and determining symbol timing using a cyclic shift.

$$\tilde{r}_l(k) = e^{\frac{j\pi r(k+p_l)(k+1+p_l)}{N_{ESS}}} \quad \text{[Equation 3]}$$

In Equation 3, l, k, r, $p_l$ and $N_{ESS}$ represent an OFDM symbol index, a subcarrier index, a root index of the ZC sequence, a cyclic shift of a ZC sequence mapping with an l-th OFDM symbol index and an ESS sequence length, respectively.

In Equation 3, a region in which additional information can be allocated, such as the root index, is present in addition to the cyclic shift allocating symbol timing information.

By using such additional resources, additional information necessary for a synchronization process can also be transmitted in addition to symbol timing information.

Additional information necessary for the synchronization process may include beam related information such as a beam period, a subframe index in a beam period and the number of BRS ports.

Although such beam related information can be directly mapped to a fundamental ESS sequence as shown in the example represented by Equation 3, the number of candidates that can be mapped may be limited or performance may deteriorate according to sequence characteristics in this case.

Accordingly, as another method for defining an ESS sequence, a scrambling code can be additionally applied to a fundamental ESS sequence.

When a physical cell ID (PCI) based scrambling code is applied to an ESS sequence, interference can be reduced in an inter-cell interference situation and thus performance benefits can be expected.

Further, a base station can map additional information (e.g., beam related information) related to a synchronization process to a scrambling code and transmit the information to a terminal.

Hereinafter, a method of generating an ESS sequence on the basis of a scrambling code and/or an OCC and a method of determining a scrambling code and an OCC applied to an ESS will be described through various embodiments and various methods of the embodiments.

First Embodiment

A first embodiment is a method of generating an ESS sequence on the basis of a scrambling code and determining the scrambling code of the ESS using a cell ID, a beam period and the number of BRS ports.

The first embodiment can reduce inter-cell interference during ESS detection by applying a cell ID based scrambling code in the case of an ESS detected after cell ID detection through a PSS and an SSS.

That is, an ESS sequence can be generated using a cell ID based scrambling code and the scrambling code can be defined or determined on the basis of information about a cell ID, a beam period and the number of BRS ports.

Accordingly, a terminal can additionally obtain information about the beam period and the number of BRS ports during ESS detection.

That is, the first embodiment provides a method of defining a scrambling code for an ESS on the basis of information about a cell ID, a beam period and the number of BRS ports, generating the ESS and transmitting information about the beam period and the number of BRS ports to a terminal through the ESS.

In addition, the first embodiment can be classified into various methods as follows according to information for determining a scrambling code.

(Method 1)

Method 1 is a method of generating an ESS sequence on the basis of a scrambling code and determining the scrambling code for an ESS through a cell ID and a beam period.

The following equation 4 shows an example of defining a scrambling code for an ESS using a cell ID and a beam period and generating an ESS sequence on the basis of the scrambling code.

$$r_l(k)=s_{c,b}(k)\times \tilde{r}_l(k), k=0,\ldots,N_{ESS}-1 \quad \text{[Equation 4]}$$

In Equation 4, $r_l(k)$ represents an ESS sequence corresponding to a k-th subcarrier and an l-th OFDM symbol, $s_{c,b}(k)$ represents a scrambling code corresponding to cell ID c, beam period configuration b and the k-th subcarrier, $\tilde{r}_l(k)$ represents a sequence corresponding to the k-th subcarrier and the l-th OFDM symbol, k is a subcarrier index and $N_{ESS}$ is the number of ESS subcarriers.

In Equation 4, the scrambling code can be generated through a pseudo-random sequence, and the pseudo-random sequence can be generated using a Gold sequence.

The following equation 5 shows an example of an initialization method based on a cell ID and a beam period configuration with respect to a length-31 Gold sequence.

$$c_{init} = 2^{10}\cdot(n_b+1)\cdot(2\cdot N_{cell}+1)+2\cdot N_{cell}+i \quad \text{[Equation 5]}$$

$$\text{where } i = \begin{cases} 1 & \text{for 1st SS in one frame} \\ 0 & \text{for 2nd SS in one frame} \end{cases}$$

That is, Equation 5 represents initialization of a second m-sequence of a length-31 Gold sequence on the basis of a cell ID and a beam period configuration.

In Equation 5, $n_b$, $N_{cell}$ and i represent a beam period configuration index, a cell ID index and a synchronization subframe index, respectively.

(Method 2)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 2 of the first embodiment provides a method of including a subframe index in a beam period in a scrambling code for an ESS.

The following equation 6 shows an example of defining a scrambling code for an ESS using a cell ID, a beam period and subframe index information in the beam period and generating an ESS sequence through the scrambling code.

$$r_l(k)=s_{c,b,s}(k)\times \tilde{r}_l(k), k=0,\ldots,N_{ESS}-1 \quad \text{[Equation 6]}$$

The following equation 7 shows an example of initialization of a second m-sequence of a length-31 Gold sequence on the basis of a cell ID, a beam period and subframe index information in the beam period.

$$c_{init}=2^{11}\cdot(n_b+1)\cdot(2^2\cdot N_{cell}+3)+2^2\cdot N_{cell}+n_s$$

where $n_s \in \{0,1,2,3\}$ [Equation 7]

In Equation 6, $r_l(k)$, $s_{c,b,s}(k)$, $\tilde{r}_l(k)$, k and $N_{ESS}$ represent an ESS sequence corresponding to a k-th subcarrier and an l-th OFDM symbol, a scrambling code corresponding to cell ID c, beam period configuration b, subframe index s and the k-th subcarrier, a sequence corresponding to the k-th subcarrier and the l-th OFDM symbol, a subcarrier index and the number of ESS subcarriers, respectively.

In addition, in Equation 7, $n_b$, $n_s$, and $N_{cell}$ represent a beam period configuration index, a subframe index and a cell ID index, respectively.

(Method 3)

Method 3 is a method of generating an ESS sequence on the basis of a scrambling code and determining the scrambling code for an ESS using a cell ID and the number of BRS ports.

That is, method 3 provides a method of defining a scrambling code for an ESS on the basis of a cell ID and the number of BRS ports and delivering or transmitting, by a base station, the number of BRS ports to a terminal through the ESS generated using the scrambling code.

The following equation 8 shows an example of defining a scrambling code for an ESS using a cell ID and the number of BRS ports and generating an ESS sequence through the scrambling code.

$$r_l(k)=s_{c,p}(k)\times \tilde{r}_l(k), k=0,\ldots,N_{ESS}-1 \quad \text{[Equation 8]}$$

In Equation 8, $r_l(k)$, $s_{c,p}(k)$, $\tilde{r}_l(k)$, k and $N_{ESS}$ represent an ESS sequence corresponding to a k-th subcarrier and an l-th OFDM symbol, a scrambling code corresponding to cell ID c, BRS port configuration p and the k-th subcarrier, a sequence corresponding to the k-th subcarrier and the l-th OFDM symbol, a subcarrier index and the number of ESS subcarriers, respectively.

The scrambling code in Equation 8 can be generated through a pseudo-random sequence and the pseudo-random sequence can be generated using a Gold sequence.

The following equation 9 shows an example of initialization based on a cell ID and a BRS port configuration with respect to a length-31 Gold sequence.

$$c_{init} = 2^{10}\cdot(n_p+1)\cdot(2\cdot N_{cell}+1)+2\cdot N_{cell}+i \quad \text{[Equation 9]}$$

$$\text{where } i = \begin{cases} 1 & \text{for 1st SS in one frame} \\ 0 & \text{for 2nd SS in one frame} \end{cases}$$

In Equation 9, $n_p$, $N_{cell}$ and i represent a BRS port configuration index, a cell ID index and a synchronization subframe index, respectively.

(Method 4)

Method 4 is a method of generating an ESS sequence on the basis of a scrambling code and determining the scrambling code for an ESS using a cell ID, a beam period and the number of BRS ports.

Method 4 provides a method of defining a scrambling code for an ESS on the basis of a cell ID, a beam period and the number of BRS ports and delivering, by a base station, the beam period and the number of BRS ports to a terminal using the ESS generated on the basis of the scrambling code.

The following equation shows an embodiment of defining an ESS and a scrambling code for the ESS using a cell ID, a beam period and the number of BRS ports.

$$r_l(k)=s_{c,b,p}(k)\times \tilde{r}_l(k), k=0,\ldots,N_{ESS}-1 \quad \text{[Equation 10]}$$

In Equation 10, $r_l(k)$, $s_{c,b,p}(k)$, $\tilde{r}_l(k)$, k and $N_{ESS}$ represent an ESS sequence corresponding to a k-th subcarrier and an l-th OFDM symbol, a scrambling code corresponding to cell ID c, beam period configuration b, BRS port configuration p and the k-th subcarrier, a sequence corresponding to the k-th subcarrier and the l-th OFDM symbol, a subcarrier index and the number of ESS subcarriers, respectively.

The scrambling code in Equation 10 can be generated through a pseudo-random sequence and the pseudo-random sequence can be generated using a Gold sequence.

The following equation 11 shows an example of initialization based on a cell ID, a beam period and a BRS port configuration with respect to a length-31 Gold sequence.

$$c_{init} = 2^{10} \cdot (8 \cdot (n_b + 1) + n_p + 1) \cdot (2 \cdot N_{cell} + 1) + 2 \cdot N_{cell} + i$$

$$\text{where } i = \begin{cases} 1 & \text{for 1st SS in one frame} \\ 0 & \text{for 2nd SS in one frame} \end{cases}$$

[Equation 11]

In Equation 11, $n_b$, $n_p$, $N_{cell}$ and i represent a beam period configuration index, a BRS port configuration index, a cell ID index and a synchronization subframe index, respectively.

(Method 5)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 5 of the first embodiment provides a method of including a subframe index in a beam period in a scrambling code for an ESS.

The following equation 12 shows an embodiment of defining an ESS and a scrambling code for the ESS using a cell ID, the number of BRS ports, a beam period and subframe index information in the beam period.

$$r_l(k)=s_{c,b,p,s}(k) \times \tilde{r}_l(k), k=0, \ldots, N_{ESS}-1 \qquad \text{[Equation 12]}$$

The following equation 13 shows an example of initialization of a second m-sequence of a length-31 Gold sequence on the basis of a cell ID, a beam period configuration, a BRS port configuration and a subframe index in a beam period.

$$c_{init}=2^{11} \cdot (8 \cdot (n_b+1)+n_p+1) \cdot (2^2 \cdot N_{cell}+3)+2^2 \cdot N_{cell}+n_s$$

where $n_s \in \{0,1,2,3\}$ [Equation 13]

In Equation 12, $r_l(k)$, $s_{c,b,p,s}(k)$, $\tilde{r}_l(k)$, k and $N_{ESS}$ represent an ESS sequence corresponding to a k-th subcarrier and an l-th OFDM symbol, a scrambling code corresponding to cell ID c, beam period configuration b, BRS port configuration p, subframe index s and the k-th subcarrier, a sequence corresponding to the k-th subcarrier and the l-th OFDM symbol, a subcarrier index and the number of ESS subcarriers, respectively.

In addition, in Equation 13, $n_b$, $n_p$, $n_s$ and $N_{cell}$ represent a beam period configuration index, a beam port configuration index, a subframe index and a cell ID index, respectively.

Second Embodiment

A second embodiment provides a method of generating an ESS sequence to be repeatedly transmitted on the basis of a scrambling code and determining the scrambling code for an ESS on the basis of a cell ID, a beam period and the number of BRS ports.

A repeated transmission technique can be used as a method for compensating for high pathloss in the mmWave cellular system.

When it can be assumed that radio channels are similar between two received signals, SNR gain corresponding to the number of repetitions can be obtained through coherent combining.

Further, even when it cannot be assumed that radio channels are similar between two received signals, performance improvement can be achieved through non-coherent combining (power accumulation).

Since synchronization signals need to be received and detected even in poor channel environments, the repeated transmission method can be considered for performance improvement.

When synchronization signals are repeatedly transmitted in this manner, additional information can also be transmitted to a terminal by transmitting information about a cell ID, a beam period and the number of BRS ports through a scrambling code for an ESS sequence.

The second embodiment provides a method of transmitting a beam period and the number of BRS ports to a terminal using a scrambling code when an ESS sequence to be repeatedly transmitted is generated.

In addition, the second embodiment can be classified into various methods as follows according to information for determining a scrambling code.

(Method 1)

Method 1 is a method of generating an ESS sequence to be repeatedly transmitted on the basis of a scrambling code and determining the scrambling code for an ESS through a cell ID and a beam period.

The following equation 14 shows an example of defining a scrambling code for an ESS to be repeatedly transmitted using a cell ID and a beam period and generating an ESS sequence on the basis of the scrambling code.

$$r_{l'}(k)=s_{c,b}(k) \times \tilde{r}_{l'}(k), k=0, \ldots, N_{ESS}-1, l'=\lfloor l/N_R \rfloor \qquad \text{[Equation 14]}$$

In Equation 14, $r_{l'}(k)$, $s_{c,b}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, beam period configuration b and the k-th subcarrier, a sequence corresponding to the k-th subcarrier and the l'-th transmission among the $N_R$ repeated transmissions, a subcarrier index, an OFDM symbol index, the number of ESS subcarriers and the number of repeated transmissions, respectively.

In Equation 14, the scrambling code can be generated through a pseudo-random sequence, and the pseudo-random sequence can be generated using a Gold sequence.

The following equation 15 shows an example of an initialization method based on a cell ID and a beam period configuration with respect to a length-31 Gold sequence.

$$c_{init} = 2^{10} \cdot (n_b + 1) \cdot (2 \cdot N_{cell} + 1) + 2 \cdot N_{cell} + i \qquad \text{[Equation 15]}$$

$$\text{where } i = \begin{cases} 1 & \text{for 1st SS in one frame} \\ 0 & \text{for 2nd SS in one frame} \end{cases}$$

In Equation 15, $n_b$, $N_{cell}$ and i represent a beam period configuration index, a cell ID index and a synchronization subframe index, respectively.

(Method 2)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 2 of the second embodiment provides a method of including a subframe index in a beam period in a scrambling code for an ESS.

The following equation 16 shows an example of defining a scrambling code for an ESS using a cell ID, a beam period and subframe index information in the beam period and generating an ESS sequence through the scrambling code.

$$r_{l'}(k) = s_{c,b,s}(k) \times \tilde{r}_{l'}(k), k=0, \ldots, N_{ESS}-1, l' = \lfloor l/N_R \rfloor \quad \text{[Equation 16]}$$

The following equation 17 shows an example of initialization of a second m-sequence of a length-31 Gold sequence on the basis of a cell ID, a beam period configuration and a subframe index when an ESS is repeatedly transmitted.

$$c_{init} = 2^{11} \cdot (n_b + 1) \cdot (2^2 \cdot N_{cell} + 3) + 2^2 \cdot N_{cell} + n_s$$

where $n_s \in \{0,1,2,3\}$ [Equation 17]

In Equation 16, $r_{l'}(k)$, $s_{c,b,s}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, beam period configuration b, subframe index s and the k-th subcarrier, a sequence corresponding to the k-th subcarrier and the l'-th transmission among the $N_R$ repeated transmissions, a subcarrier index, an OFDM symbol index, the number of ESS subcarriers and the number of repeated transmissions, respectively.

In addition, in Equation 17, $n_b$, $n_s$, and $N_{cell}$ represent a beam period configuration index, a subframe index and a cell ID index, respectively.

(Method 3)

Method 3 is a method of generating an ESS sequence to be repeatedly transmitted on the basis of a scrambling code and determining the scrambling code for an ESS using a cell ID and the number of BRS ports.

That is, method 3 provides a method of defining a scrambling code for an ESS to be repeatedly transmitted on the basis of a cell ID and the number of BRS ports and delivering the number of BRS ports through an ESS.

The following equation 18 shows an example of defining a scrambling code for an ESS to be repeatedly transmitted using a cell ID and the number of BRS ports and generating an ESS sequence through the scrambling code.

$$r_{l'}(k) = s_{c,p}(k) \times \tilde{r}_{l'}(k), k=0, \ldots, N_{ESS}-1, l' = \lfloor l/N_R \rfloor \quad \text{[Equation 18]}$$

In Equation 18, $r_{l'}(k)$, $s_{c,p}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers and the number of repeated transmissions, respectively.

The scrambling code in Equation 18 can be generated through a pseudo-random sequence and the pseudo-random sequence can be generated using a Gold sequence.

The following equation 19 shows an example of initialization based on a cell ID and a BRS port configuration with respect to a length-31 Gold sequence.

$$c_{init} = 2^{10} \cdot (n_p + 1) \cdot (2 \cdot N_{cell} + 1) + 2 \cdot N_{cell} + i \quad \text{[Equation 19]}$$

where $i = \begin{cases} 1 & \text{for 1st SS in one frame} \\ 0 & \text{for 2nd SS in one frame} \end{cases}$ In Equation 19, $n_p$, $N_{cell}$ and i represent a BRS port configuration index, a cell ID index and a synchronization subframe index, respectively.

(Method 4)

Method 4 is a method of generating an ESS sequence to be repeatedly transmitted on the basis of a scrambling code and determining the scrambling code for an ESS using a cell ID, a beam period and the number of BRS ports.

That is, method 4 provides a method of defining a scrambling code for an ESS to be repeatedly transmitted on the basis of a cell ID, a beam period and the number of BRS ports and delivering the beam period and the number of BRS ports through the ESS to be repeatedly transmitted.

The following equation 20 shows an example of defining a scrambling code for an ESS using a cell ID, a beam period and the number of BRS ports and generating an ESS sequence on the basis of the scrambling code.

$$r_{l'}(k) = s_{c,b,p}(k) \times \tilde{r}_{l'}(k), k=0, \ldots, N_{ESS}-1, l' = \lfloor l/N_R \rfloor \quad \text{[Equation 20]}$$

In Equation 20, $r_{l'}(k)$, $s_{c,b,p}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, beam period configuration b, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers, respectively.

The scrambling code in Equation 20 can be generated through a pseudo-random sequence and the pseudo-random sequence can be generated using a Gold sequence.

The following equation 21 shows an example of initialization based on a cell ID, a beam period and a BRS port configuration with respect to a length-31 Gold sequence.

$$c_{init} = 2^{10} \cdot (8 \cdot (n_b + 1) + n_p + 1) \cdot (2 \cdot N_{cell} + 1) + 2 \cdot N_{cell} + i \quad \text{[Equation 21]}$$

where $i = \begin{cases} 1 & \text{for 1st SS in one frame} \\ 0 & \text{for 2nd SS in one frame} \end{cases}$ In Equation 21, $n_b$, $n_p$, $N_{cell}$ and i represent a beam period configuration index, a BRS port configuration index, a cell ID index and a synchronization subframe index, respectively.

(Method 5)

A beam period of each base station may change according to factors such as the coverage and the number of ports of a base station. In addition, when a beam period is equal to or greater than 2 subframes, an ambiguity problem with respect to subframe positions in the beam period occurs even after symbol timing detection using an ESS. As a method for solving such ambiguity, method 5 of the second embodiment provides a method of including a subframe index in a beam period in a scrambling code for an ESS.

The following equation 22 shows an embodiment of defining an ESS and a scrambling code for the ESS using a cell ID, the number of BRS ports, a beam period and subframe index information in the beam period.

$$r_{l'}(k)=s_{c,b,p,s}(k) \times \tilde{r}_{l'}(k), k=0,\ldots,N_{ESS}-1, l'=\lfloor l/N_R \rfloor \quad \text{[Equation 22]}$$

Equation 23 shows an example of initialization of a second m-sequence of a length-31 Gold sequence on the basis of a cell ID, a beam period configuration, a BRS port configuration and a subframe index.

$$c_{init}=2^{11} \cdot (8 \cdot (n_b+1)+n_p+1) \cdot (2^2 \cdot N_{cell}+3)+2^2 \cdot N_{cell}+n_s$$

where $n_s \in \{0,1,2,3\}$ [Equation 23]

In Equation 22, $r_{l'}(k)$, $s_{c,b,p,s}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, beam period configuration b, BRS port configuration p, subframe index s and the k-th subcarrier, a sequence corresponding to the k-th subcarrier and the l'-th transmission among the $N_R$ repeated transmissions, a subcarrier index, an OFDM symbol index, the number of ESS subcarriers, respectively.

In addition, in Equation 23, $n_b$, $n_p$, $n_s$ and $N_{cell}$ represent a beam period configuration index, a beam port configuration index, a subframe index and a cell ID index, respectively.

Third Embodiment

A third embodiment is a method of generating ESS sequences to be repeatedly transmitted on the basis of scrambling codes, determining a scrambling code for an odd-numbered ESS sequence using a cell ID and a beam period and determining a scrambling code for an even-numbered ESS sequence using the cell ID and the number of BRS ports.

When an ESS is repeatedly transmitted according to the third embodiment, it is possible to allocate different pieces of information to scrambling codes for ESS sequences according to transmission order to reduce complexity necessary for a receiving end (terminal) to detect the information.

The following table 4 shows an example in which complexity when the same ESS sequence is used for an ESS sequence consecutively transmitted twice is compared with complexity when different ESS sequences are used therefor.

That is, Table 4 shows an example of comparison of complexities according to an ESS sequence mapping method.

TABLE 4

| Parameters |
|---|
| Beam period configuration: 4 |
| BRS port configuration: 8 |
| Number of the repetition: 2 |
| Number of the symbol index of ESS: 7 |

| Same ESS sequence | Different ESS sequence |
|---|---|
| 7 × 4 × 8 = 224 | 7 × 8 + 4 = 60 or 7 × 4 + 8 = 36 |

As shown in Table 4, a case in which information on a total of four beam period configurations and a total of eight BRS port configurations is delivered can be assumed.

Here, when the same scrambling code is applied to an ESS repeatedly transmitted twice, 7×4×8=224 correlation computations are required.

However, when a beam period configuration and a BRS port configuration are mapped to the first ESS and the second ESS, 7×4+8=36 correlation computations are required, considerably reducing the number of computations.

That is, the third embodiment provides a method of defining different scrambling codes for an odd-numbered ESS sequence and an even-numbered ESS sequence and delivering a beam period and the number of BRS ports when an ESS sequence to be repeatedly transmitted is generated.

In addition, the third embodiment can be classified into the following various methods according to information for determining scrambling codes.

(Method 1)

Method 1 pertains to an embodiment of differently defining an odd-numbered ESS and an even-numbered ESS using information about a cell ID, a beam period and the number of BRS ports.

The following equation 24 represents an example of method 1.

$$r_{odd,l'}(k)=s_{c,b}(k) \times \tilde{r}_{l'}(k), k=0,\ldots,N_{ESS}-1, l'=\lfloor l/N_R \rfloor$$

where $\mathrm{mod}(l,2)=0$ $$r_{even,l''}(k)=\tilde{s}_{c,p}(k) \times \tilde{r}_{l''}(k), k=0,\ldots,N_{ESS}-1, l''=\lfloor l/N_R \rfloor$$

where $\mathrm{mod}(l,2)=1$ [Equation 24]

In Equation 24, $r_{odd,l'}(k)$, $r_{even,l''}(k)$, $s_{c,b}(k)$, $\tilde{s}_{c,p}(k)$, $\tilde{r}_{l'}(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c, beam period configuration b and the k-th subcarrier, a scrambling code corresponding to cell ID c, beam port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

The scrambling codes in Equation 24 can be generated through a pseudo-random sequence and the pseudo-random sequence can be generated using a Gold sequence.

The following equation 25 shows an example of initialization of scrambling codes for odd-numbered and even-numbered ESS sequences with respect to a length-31 Gold sequence.

$$c_{odd,init} = 2^{10} \cdot (n_b+1) \cdot (2 \cdot N_{cell}) + 2 \cdot N_{cell} + i \quad \text{[Equation 25]}$$

$$c_{even,init} = 2^{10} \cdot (n_p+1) \cdot (2 \cdot N_{cell}+1) + 2 \cdot N_{cell} + i$$

where $i = \begin{cases} 1 & \text{for 1st SS in one frame} \\ 0 & \text{for 2nd SS in one frame} \end{cases}$ In Equation 25, $n_b$, $n_p$, $N_{cell}$ and i represent a beam period configuration index, a BRS port configuration index, a cell ID index and a synchronization subframe index, respectively.

(Method 2)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 2 of the third embodiment provides a method of including a subframe index in a beam period in a scrambling code for an ESS.

The following equation 26 shows an example of defining different scrambling codes for an odd-numbered ESS and an even-numbered ESS using information about a cell ID, a beam period and the number of BRS ports to generate ESS sequences.

$$r_{odd,l'}(k) = s_{c,b,s}(k) \times \tilde{r}_l(k), k=0,\ldots,N_{ESS}-1, l' = \lfloor l/N_R \rfloor$$

where $\mod(l,2)=0$ $$r_{even,l''}(k) = \tilde{s}_{c,p}(k) \times \tilde{r}_{l''}(k), k=0,\ldots,N_{ESS}-1, l'' = \lfloor l/N_R \rfloor$$

where $\mod(l,2)=1$ [Equation 26]

$$c_{odd,init} = 2^{11} \cdot (n_p+1) \cdot (2^2 \cdot N_{cell}) + 2^2 \cdot N_{cell} + n_s$$

$$c_{even,init} = 2^{11} \cdot (n_p+1) \cdot (2^2 \cdot N_{cell}+3) + 2^2 \cdot N_{cell} + n_s$$

where $n_s \in \{0,1,2,3\}$ [Equation 27]

In Equation 26, $r_{odd,l'}(k)$, $r_{even,l''}(k)$, $s_{c,b,s}(k)$, $\tilde{s}_{c,p}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c, beam period configuration b, subframe index s and the k-th subcarrier, a scrambling code corresponding to cell ID c, beam port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

In addition, in Equation 27, $n_b$, $n_s$, $n_p$, $N_{cell}$ and i represent a beam period configuration index, a subframe index, a BRS port configuration index, a cell ID index and a synchronization subframe index, respectively.

(Method 3)

Method 3 is a method of generating an ESS sequence to be repeatedly transmitted on the basis of scrambling codes, determining a scrambling code for an odd-numbered ESS sequence using a cell ID and the number of BRS ports and determining a scrambling code for an even-numbered ESS sequence using the cell ID and a beam period.

The following equation 28 shows an embodiment of differently defining an odd-numbered ESS and an even-numbered ESS using information about a cell ID, a beam period and the number of BRS ports.

$$r_{odd,l'}(k) = \tilde{s}_{c,p}(k) \times \tilde{r}_l(k), k=0,\ldots,N_{ESS}-1, l' = \lfloor l/N_R \rfloor$$

where $\mod(l,2)=0$ $$r_{even,l''}(k) = s_{c,b}(k) \times \tilde{r}_{l''}(k), k=0,\ldots,N_{ESS}-1, l'' = \lfloor l/N_R \rfloor$$

where $\mod(l,2)=1$ [Equation 28]

In Equation 28, $r_{odd,l'}(k)$, $r_{even,l''}(k)$, $\tilde{s}_{c,p}(k)$, $s_{c,b}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c, BRS port configuration p and the k-th subcarrier, a scrambling code corresponding to cell ID c, beam period configuration b and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

The scrambling codes in Equation 28 can be generated through a pseudo-random sequence and the pseudo-random sequence can be generated using a Gold sequence.

The following equation 29 shows an example of initialization of scrambling codes for odd-numbered and even-numbered ESS sequences with respect to a length-31 Gold sequence.

$$c_{odd,init} = 2^{10} \cdot (n_p+1) \cdot (2 \cdot N_{cell}) + 2 \cdot N_{cell} + i$$ [Equation 29]

$$c_{even,init} = 2^{10} \cdot (n_b+1) \cdot (2 \cdot N_{cell}+1) + 2 \cdot N_{cell} + i$$

where $i = \begin{cases} 1 & \text{for 1st SS in one frame} \\ 0 & \text{for 2nd SS in one frame} \end{cases}$ In Equation 29, $n_p$, $n_b$, $N_{cell}$ and i represent a BRS port configuration index, a beam period configuration index, a cell ID index and a synchronization subframe index, respectively.

(Method 4)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 4 of the third embodiment provides a method of including a subframe index in a beam period in a scrambling code for an ESS.

The following equation 30 shows an example of defining different scrambling codes for an odd-numbered ESS and an even-numbered ESS using information about a cell ID, a beam period and the number of BRS ports.

$$r_{odd,l'}(k) = \tilde{s}_{c,p}(k) \times \tilde{r}_l(k), k=0,\ldots,N_{ESS}-1, l' = \lfloor l/N_R \rfloor$$

where $\mod(l,2)=0$ $$r_{even,l''}(k) = s_{c,b,s}(k) \times \tilde{r}_{l''}(k), k=0,\ldots,N_{ESS}-1, l'' = \lfloor l/N_R \rfloor$$

where $\mod(l,2)=1$ [Equation 30]

$$c_{odd,init} = 2^{11} \cdot (n_p+1) \cdot (2^2 \cdot N_{cell}) + 2^2 \cdot N_{cell} + n_s$$

$$c_{even,init} = 2^{11} \cdot (n_b+1) \cdot (2^2 \cdot N_{cell}+3) + 2^2 \cdot N_{cell} + n_s$$

where $n_s \in \{0,1,2,3\}$ [Equation 31]

In Equation 30, $r_{odd,l'}(k)$, $r_{even,l''}(k)$, $s_{c,b,s}(k)$, $\tilde{s}_{c,p}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c, beam period configuration b, subframe index s and the k-th subcarrier, a scrambling code corresponding to cell ID c, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

In addition, in Equation 31, $n_b$, $n_s$, $n_p$, $N_{cell}$ and i represent a beam period configuration index, a subframe index, a BRS port configuration index, a cell ID index and a synchronization subframe index, respectively.

Fourth Embodiment

A fourth embodiment is a method of generating ESS sequences to be repeatedly transmitted on the basis of scrambling codes, determining a scrambling code for an odd-numbered ESS sequence using a cell ID and determining a scrambling code for an even-numbered ESS sequence using the cell ID, a beam period and the number of BRS ports.

According to the above-described third embodiment, different pieces of information can be mapped to an odd-numbered sequence and an even-numbered sequence of a repeatedly transmitted ESS sequence to reduce the number of computations necessary for detection in a receiving end (or a terminal).

In such a case, however, the benefits which can be obtained by combining the same sequences is lost and thus performance deterioration may occur.

Such disadvantages can be overcome using the following method.

For example, in the case of an ESS sequence consecutively transmitted twice, a scrambling code for the first ESS sequence is determined using a cell ID and a scrambling code for the second ESS sequence is determined using the cell ID, a beam period and the number of BRS ports.

A receiving end, that is, a terminal removes the scrambling codes of the first and second ESS sequences and then compares vectors of the two received signals to detect the beam period and the number of BRS ports.

In addition, the receiving end can combine the vectors of the received signals to detect a symbol index, maintaining the combining benefits.

The aforementioned method can separate detection of a beam period and the number of BRS ports from detection of a symbol index to reduce complexity and maintain the combining benefits.

The following table 5 shows an example in which complexity when the same ESS sequence is used for an ESS sequence consecutively transmitted twice is compared with complexity when different ESS sequences are used therefor.

TABLE 5

| Parameters |
| --- |
| Beam period configuration: 4<br>BRS port configuration: 8<br>Number of the repetition: 2<br>Number of the symbol index of ESS: 7 |

| Same ESS sequence | Different ESS sequence |
| --- | --- |
| 7 × 4 × 8 = 224 | 1 × 4 × 8 + 7 = 39 |

Further, the fourth embodiment can be classified into the following various methods according to information for determining a scrambling code.

(Method 1)

Method 1 is a method of determining a scrambling code for an odd-numbered ESS sequence using a cell ID, determining a scrambling code for an even-numbered ESS sequence using the cell ID, a beam period and the number of BRS ports and delivering the beam period and the number of BRS ports when an ESS sequence to be repeatedly transmitted is generated.

The following equation 32 shows an example of determining a scrambling code for an odd-numbered ESS sequence using a cell ID and determining a scrambling code for an even-numbered ESS sequence using the cell ID, a beam period and the number of BRS ports.

$$r_{odd,l'}(k) = s_c(k) \times \tilde{r}_{l'}(k), k=0, \ldots, N_{ESS}-1, l' = \lfloor l/N_R \rfloor$$

where $\mod(l,2)=0$ $$r_{even,l''}(k) = \tilde{s}_{c,b,p}(k) \times \tilde{r}_{l'}(k), k=0, \ldots, N_{ESS}-1, l'' = \lfloor l/N_R \rfloor$$

where $\mod(l,2)=1$ [Equation 32]

In Equation 32, $r_{odd,l'}(k)$, $r_{even,l''}(k)$, $s_c(k)$, $\tilde{s}_{c,b,p}(k)$, $\tilde{r}_{l'}(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c and the k-th subcarrier, a scrambling code corresponding to cell ID c, beam period configuration b, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

The scrambling codes in Equation 32 can be generated through a pseudo-random sequence and the pseudo-random sequence can be generated using a Gold sequence.

The following equation 33 shows an embodiment of initialization of scrambling codes for odd-numbered and even-numbered ESS sequences with respect to a length-31 Gold sequence.

[Equation 33]

$$c_{odd,init} = 2^{10} \cdot (2 \cdot N_{cell}) + 2 \cdot N_{cell} + i$$

$$c_{even,init} = 2^{10} \cdot (8 \cdot (n_b + 1) + n_p + 1) \cdot (2 \cdot N_{cell} + 1) + 2 \cdot N_{cell} + i$$

where $i = \begin{cases} 1 & \text{for 1st SS in one frame} \\ 0 & \text{for 2nd SS in one frame} \end{cases}$ In Equation 33, $n_b$, $n_p$, $N_{cell}$ and i represent a beam period configuration index, a BRS port configuration index, a cell ID index and a synchronization subframe index, respectively.

(Method 2)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 2 of the fourth embodiment provides a method of including a subframe index in a beam period in a scrambling code for an ESS.

The following equation 34 shows an embodiment of determining a scrambling code for an odd-numbered ESS sequence using a cell ID and determining a scrambling code for an even-numbered ESS sequence using the cell ID, a beam period, a subframe index and the number of BRS ports.

$$r_{odd,l'}(k)=s_c(k)\times \tilde{r}_{l'}(k), k=0,\ldots,N_{ESS}-1, l'=\lfloor l/N_R \rfloor$$

where $\mod(l,2)=0$ $$r_{even,l''}(k)=\tilde{s}_{c,b,s,p}(k)\times \tilde{r}_{l''}(k), k=0,\ldots,N_{ESS}-1, l''=\lfloor l/N_R \rfloor$$

where $\mod(l,2)=1$ [Equation 34]

$$c_{odd,init}=2^{11}\cdot(2^2\cdot N_{cell})+2^2\cdot N_{cell}+n_s$$

$$c_{even,init}=2^{11}\cdot(8\cdot(n_b+1)+n_p+1)\cdot(2^2\cdot N_{cell}+3)+2^2\cdot N_{cell}+n_s$$

where $n_s \in \{0,1,2,3\}$ [Equation 35]

In Equation 34, $r_{odd,l'}(k)$, $r_{even,l''}(k)$, $s_c(k)$, $\tilde{s}_{c,b,s,p}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l"-th transmission among the $N_R$ repeated transmissions, a scrambling code corresponding to cell ID c and the k-th subcarrier, a scrambling code corresponding to cell ID c, beam period configuration b, subframe index s, BRS port configuration p and the k-th subcarrier, a sequence corresponding to the k-th subcarrier and the l'-th transmission among the Nn repeated transmissions, a subcarrier index, an OFDM symbol index, the number of ESS subcarriers, and the number of repeated transmissions, respectively.

In addition, in Equation 35, $n_b$, $n_s$, $n_p$, $N_{cell}$ and i represent a beam period configuration index, a subframe index, a BRS port configuration index, a cell ID index and a synchronization subframe index, respectively.

(Method 3)

Method 3 is a method of generating an ESS sequence to be repeatedly transmitted on the basis of scrambling codes, determining a scrambling code for an odd-numbered ESS sequence using a cell ID, a beam period and the number of BRS ports and determining a scrambling code for an even-numbered ESS sequence using the cell ID.

The following equation 36 shows an embodiment of determining a scrambling code for an odd-numbered ESS sequence using a cell ID, a beam period and the number of BRS ports and determining a scrambling code for an even-numbered ESS sequence using the cell ID.

$$r_{odd,l'}(k)=\tilde{s}_{c,b,p}(k)\times \tilde{r}_{l'}(k), k=0,\ldots,N_{ESS}-1, l'=\lfloor l/N_R \rfloor$$

where $\mod(l,2)=0$ $$r_{even,l''}(k)=s_c(k)\times \tilde{r}_{l''}(k), k=0,\ldots,N_{ESS}-1, l''=\lfloor l/N_R \rfloor$$

where $\mod(l,2)=1$ [Equation 36]

In Equation 36, $r_{odd,l'}(k)$, $r_{even,l''}(k)$, $s_c(k)$, $\tilde{s}_{c,b,p}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l"-th transmission among the $N_R$ repeated transmissions, a scrambling code corresponding to cell ID c and the k-th subcarrier, a scrambling code corresponding to cell ID c, beam period configuration b, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

The scrambling codes in Equation 36 can be generated through a pseudo-random sequence and the pseudo-random sequence can be generated using a Gold sequence.

The following equation 37 shows an embodiment of initialization of scrambling codes for odd-numbered and even-numbered ESS sequences with respect to a length-31 Gold sequence.

[Equation 37]

$$c_{odd,init} = 2^{10}\cdot(8\cdot(n_b+1)+n_p+1)\cdot(2\cdot N_{cell})+2\cdot N_{cell}+i$$

$$c_{even,init} = 2^{10}\cdot(2\cdot N_{cell}+1)+2\cdot N_{cell}+i$$

where $i = \begin{cases} 1 & \text{for 1st SS in one frame} \\ 0 & \text{for 2nd SS in one frame} \end{cases}$ In Equation 37, $n_b$, $n_p$, $N_{cell}$ and i represent a beam period configuration index, a BRS port configuration index, a cell ID index and a synchronization subframe index, respectively.

(Method 4)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 4 of the fourth embodiment provides a method of including a subframe index in a beam period in a scrambling code for an ESS.

The following equation shows an embodiment of determining a scrambling code for an odd-numbered ESS sequence using a cell ID, a beam period, a subframe index and the number of BRS ports and determining a scrambling code for an even-numbered ESS sequence using the cell ID.

$$r_{odd,l'}(k)=\tilde{s}_{c,b,s,p}(k)\times \tilde{r}_{l'}(k), k=0,\ldots,N_{ESS}-1, l'=\lfloor l/N_R \rfloor$$

where $\mod(l,2)=0$ $$r_{even,l''}(k)=s_c(k)\times \tilde{r}_{l''}(k), k=0,\ldots,N_{ESS}-1, l''=\lfloor l/N_R \rfloor$$

where $\mod(l,2)=1$ [Equation 38]

$$c_{odd,init}=2^{11}\cdot(8\cdot(n_b+1)+n_p+1)\cdot(2^2\cdot N_{cell})+2^2\cdot N_{cell}+n_b$$

$$c_{even,init}=2^{11}\cdot(2^2\cdot N_{cell}+3)+2^2\cdot N_{cell}+n_b$$

where $n_b \in \{0,1,2,3\}$ [Equation 39]

In Equation 38, $r_{odd,l'}(k)$, $r_{even,l''}(k)$, $s_c(k)$, $\tilde{s}_{c,b,s,p}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l"-th transmission among the $N_R$ repeated transmissions, a scrambling code corresponding to cell ID c and the k-th subcarrier, a scrambling code corresponding to cell ID c, beam period configuration b, subframe index s, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

In addition, in Equation 39, $n_b$, $n_s$, $n_p$, $N_{cell}$ and i represent a beam period configuration index, a subframe index, a BRS port configuration index, a cell ID index and a synchronization subframe index, respectively.

(Method 5)

Method 5 is a method of generating an ESS sequence to be repeatedly transmitted on the basis of scrambling codes, determining a scrambling code for an odd-numbered ESS sequence using a cell ID and determining a scrambling code for an even-numbered ESS sequence using the cell ID and a beam period.

Method 5 provides a method of determining a scrambling code for an odd-numbered ESS sequence using a cell ID, determining a scrambling code for an even-numbered ESS sequence using the cell ID and a beam period and delivering the beam period when an ESS sequence to be repeatedly transmitted is generated.

The following equation 40 shows an embodiment of determining a scrambling code for an odd-numbered ESS sequence using a cell ID and determining a scrambling code for an even-numbered ESS sequence using the cell ID and a beam period.

$$r_{odd,l'}(k)=s_c(k)\times \tilde{r}_{l'}(k), k=0,\ldots,N_{ESS}-1, l'=\lfloor l/N_R \rfloor$$

where $\mod(l,2)=0$ $$r_{even,l''}(k)=\tilde{s}_{c,b}(k)\times \tilde{r}_{l''}(k), k=0,\ldots,N_{ESS}-1, l''=\lfloor l/N_R \rfloor$$

where $\mod(l,2)=1$ [Equation 40]

In Equation 40, $r_{odd,l'}(k)$, $r_{even,l''}(k)$, $s_c(k)$, $\tilde{s}_{c,b}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c and the k-th subcarrier, a scrambling code corresponding to cell ID c, beam period configuration b and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

The scrambling codes in Equation 40 can be generated through a pseudo-random sequence and the pseudo-random sequence can be generated using a Gold sequence.

The following equation 41 shows an embodiment of initialization of scrambling codes for odd-numbered and even-numbered ESS sequences with respect to a length-31 Gold sequence.

$$c_{odd,init} = 2^{10}\cdot(2\cdot N_{cell}) + 2\cdot N_{cell} + i$$ [Equation 41]

$$c_{even,init} = 2^{10}\cdot(n_b+1)\cdot(2\cdot N_{cell}+1) + 2\cdot N_{cell} + i$$

where $i = \begin{cases} 1 & \text{for 1st SS in one frame} \\ 0 & \text{for 2nd SS in one frame} \end{cases}$ In Equation 41, $n_b$, $N_{cell}$ and i represent a beam period configuration index, a cell ID index and a synchronization subframe index, respectively.

(Method 6)

A beam period of each base station may change according to factors such as the coverage and the number of ports of a base station.

In addition, when a beam period is equal to or greater than 2 subframes, an ambiguity problem with respect to subframe positions in the beam period occurs even after symbol timing detection using an ESS.

As a method for solving such ambiguity, method 6 of the fourth embodiment provides a method of including a subframe index in a beam period in a scrambling code for an ESS.

The following equation 42 shows an embodiment of determining a scrambling code for an odd-numbered ESS sequence using a cell ID and determining a scrambling code for an even-numbered ESS sequence using the cell ID, a beam period and a subframe index.

$$r_{odd,l'}(k)=s_c(k)\times \tilde{r}_{l'}(k), k=0,\ldots,N_{ESS}-1, l'=\lfloor l/N_R \rfloor$$

where $\mod(l,2)=0$ $$r_{even,l''}(k)=\tilde{s}_{c,b,s}(k)\times \tilde{r}_{l''}(k), k=0,\ldots,N_{ESS}-1, l''=\lfloor l/N_R \rfloor$$

where $\mod(l,2)=1$ [Equation 42]

$$c_{odd,init}=2^{11}\cdot(2^2\cdot N_{cell})+2^2\cdot N_{cell}+n_s$$

$$c_{even,init}=2^{11}\cdot(n_b+1)\cdot(2^2\cdot N_{cell}+3)+2^2\cdot N_{cell}+n_s$$

where $n_s \in \{0,1,2,3\}$ [Equation 43]

In Equation 42, $r_{odd,l'}(k)$, $r_{even,l''}(k)$, $s_c(k)$, $\tilde{s}_{c,b,s}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c and the k-th subcarrier, a scrambling code corresponding to cell ID c, beam period configuration b, subframe index s and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

In addition, in Equation 43, $n_b$, $n_s$, $N_{cell}$ and i represent a beam period configuration index, a subframe index, a cell ID index and a synchronization subframe index, respectively.

(Method 7)

Method 7 is a method of generating an ESS sequence to be repeatedly transmitted on the basis of scrambling codes, determining a scrambling code for an odd-numbered ESS sequence using a cell ID and determining a scrambling code for an even-numbered ESS sequence using the cell ID and the number of BRS ports.

Method 7 provides a method of determining a scrambling code for an odd-numbered ESS sequence using a cell ID, determining a scrambling code for an even-numbered ESS sequence using the cell ID and the number of BRS ports delivering the number of BRS ports when an ESS sequence to be repeatedly transmitted is generated.

The following equation 44 shows an embodiment of determining a scrambling code for an odd-numbered ESS sequence using a cell ID and determining a scrambling code for an even-numbered ESS sequence using the cell ID and the number of BRS ports.

$$r_{odd,l'}(k)=s_c(k)\times \tilde{r}_{l'}(k), k=0,\ldots,N_{ESS}-1, l'=\lfloor l/N_R \rfloor$$

where $\mod(l,2)=0$ $$r_{even,l''}(k)=\tilde{s}_{c,p}(k)\times \tilde{r}_{l''}(k), k=0,\ldots,N_{ESS}-1, l''=\lfloor l/N_R \rfloor$$

where $\mod(l,2)=1$ [Equation 44]

In Equation 44, $r_{odd,l'}(k)$, $r_{even,l''}(k)$, $s_c(k)$, $\tilde{s}_{c,p}(k)$, $\tilde{r}_l(k)$, k, l, $N_{ESS}$ and $N_R$ represent an odd-numbered ESS sequence corresponding to a k-th subcarrier and an l'-th transmission among $N_R$ repeated transmissions, an even-numbered ESS sequence corresponding to the k-th subcarrier and the l''-th transmission among the $N_R$ repeated transmissions, a scrambling code corresponding to cell ID c and the k-th subcarrier, a scrambling code corresponding to cell ID c, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers, and the number of repeated transmissions, respectively.

The scrambling codes in Equation 44 can be generated through a pseudo-random sequence and the pseudo-random sequence can be generated using a Gold sequence.

The following equation 45 shows an embodiment of initialization of scrambling codes for odd-numbered and even-numbered ESS sequences with respect to a length-31 Gold sequence.

$$c_{odd,init} = 2^{10} \cdot (2 \cdot N_{cell}) + 2 \cdot N_{cell} + i \quad \text{[Equation 45]}$$

$$c_{even,init} = 2^{10} \cdot (n_p + 1) \cdot (2 \cdot N_{cell} + 1) + 2 \cdot N_{cell} + i$$

$$\text{where } i = \begin{cases} 1 & \text{for 1st SS in one frame} \\ 0 & \text{for 2nd SS in one frame} \end{cases}$$

In Equation 45, $n_p$, $N_{cell}$ and i represent a BRS port configuration index, a cell ID index and a synchronization subframe index, respectively.

Fifth Embodiment

A fifth embodiment applies an orthogonal cover code (OCC) to a repeatedly transmitted ESS and determines the OCC using a beam period and the number of BRS ports.

In addition, a receiver or a terminal determines the beam period and the number of BRS ports using the OCC.

The fifth embodiment is a method for compensating for high pathloss in the mmWave cellular system and can use a repeated transmission technique.

When it can be assumed that radio channels are similar between two received signals, SNR gain corresponding to the number of repetitions can be obtained through coherent combining.

Further, even when it cannot be assumed that radio channels are similar between two received signals, performance improvement can be achieved through non-coherent combining (power accumulation).

Since synchronization signals need to be received and detected even in poor channel environments, the repeated transmission method can be considered for performance improvement.

When a synchronization signal is repeatedly transmitted in this manner, an OCC can be applied to the same synchronization signal to transmit additional information.

That is, the fifth embodiment provides a method of applying an OCC to a repeatedly transmitted ESS to deliver a beam period and the number of BRS ports.

In addition, the fifth embodiment can be classified into various methods as follows according to information for determining a scrambling code.

(Method 1)

Method 1 applies an orthogonal cover code (OCC) to a repeatedly transmitted OCC and determines the OCC using a beam period.

Further, a receiver determines the beam period using the OCC.

The followings tables 6 to 8 show embodiments with respect to mapping rules between beam periods of OCCs having lengths of 2, 3 and 4 and the OCCs.

TABLE 6

| Orthogonal cover code (Length-2) | Beam period configuration | # of subframes |
|---|---|---|
| [+1 +1] | 0 | 1 subframe |
| [+1 −1] | 1 | 2 subframes |

TABLE 7

| Orthogonal cover code (Length-3) | Beam period configuration | # of subframes |
|---|---|---|
| [+1 +1 +1] | 00 | 1 subframe |
| [+1 $e^{j2\pi/3}$ $e^{j4\pi/3}$] | 01 | 2 subframes |
| [+1 $e^{j4\pi/3}$ $e^{j2\pi/3}$] | 10 | 4 subframes |

TABLE 8

| Orthogonal cover code (Length-4) | Beam period configuration | # of subframes |
|---|---|---|
| [+1 +1 +1 +1] | 00 | 1 subframe |
| [+1 −1 +1 −1] | 01 | 2 subframe |
| [+1 −1 −1 +1] | 10 | 4 subframes |
| [+1 +1 −1 −1] | 11 | 1/2 subframes |

Tables 6 to 8 show examples of the numbers of synchronization subframes mapped to OCCs and beam period configurations.

A beam period configuration refers to a beam period state that can be represented by each OCC and can be mapped to various numbers of synchronization subframes which are not included in the aforementioned embodiments in addition to the aforementioned embodiments.

(Method 2)

Method 2 applies an orthogonal cover code (OCC) to a repeatedly transmitted OCC and determines the OCC using the number of BRS ports.

Further, a receiver or a terminal determines the number of BRS ports using the OCC.

Method 2 provides a method of applying an OCC to a repeatedly transmitted ESS to deliver the number of BRS ports.

The following table 9 shows embodiments with respect to mapping rules between the numbers of BRS ports of OCCs having lengths of 2, 3 and 4 and the OCCs.

TABLE 9

| Orthogonal cover code (Length-2) | BRS port configuration | # of the BRS port |
|---|---|---|
| [+1 +1] | 0 | 4 |
| [+1 −1] | 1 | 8 |

TABLE 10

| Orthogonal cover code (Length-3) | BRS port configuration | # of the BRS port |
|---|---|---|
| [+1 +1 +1] | 00 | 4 |
| [+1 $e^{j2\pi/3}$ $e^{j4\pi/3}$] | 01 | 8 |
| [+1 $e^{j4\pi/3}$ $e^{j2\pi/3}$] | 10 | 2 |

TABLE 11

| Orthogonal cover code (Length-4) | BRS port configuration | # of the BRS port |
|---|---|---|
| [+1 +1 +1 +1] | 00 | 4 |
| [+1 −1 +1 −1] | 01 | 8 |
| [+1 −1 −1 +1] | 10 | 2 |
| [+1 +1 −1 −1] | 11 | 1 |

The aforementioned embodiments, that is, Tables 9 to 11 show examples of the numbers of BRS ports mapped to OCCs and BRS port configurations.

A BRS port configuration refers to a BRS port state that can be represented by each OCC and can be mapped to various numbers of BRS ports which are not included in the aforementioned embodiments in addition to the aforementioned embodiments.

(Method 3)

Method 3 applies an orthogonal cover code (OCC) to a repeatedly transmitted OCC and determines the OCC using a beam period and the number of BRS ports.

Further, a receiver or a terminal determines the beam period and the number of BRS ports using the OCC.

That is, method 3 provides a method of applying an OCC to a repeatedly transmitted ESS to deliver a beam period and the number of BRS ports.

The following tables 12 to 18 show embodiment with respect to mapping rules between beam periods and the numbers of BRS ports of OCCs having lengths of 2, 3, 4 and 7 and the OCCs.

TABLE 12

| OCC (Length-2) | Beam period and BRS port configuration | # of subframes | # of the BRS ports |
|---|---|---|---|
| [+1 +1] | 0 | 1 subframe | 8 |
| [+1 −1] | 1 | 1 subframes | 4 |

TABLE 13

| OCC (Length-2) | Beam period and BRS port configuration | # of subframes | # of the BRS ports |
|---|---|---|---|
| [+1 +1] | 0 | 1 subframe | 8 |
| [+1 −1] | 1 | 2 subframes | 8 |

TABLE 14

| OCC (Length-3) | Beam period and BRS port configuration | # of subframes | # of the BRS ports |
|---|---|---|---|
| [+1 +1 +1] | 00 | 1 subframe | 8 |
| [+1 $e^{j2\pi/3}$ $e^{j4\pi/3}$] | 01 | 1 subframes | 4 |
| [+1 $e^{j4\pi/3}$ $e^{j2\pi/3}$] | 10 | 1 subframes | 2 |

TABLE 15

| OCC (Length-3) | Beam period and BRS port configuration | # of subframes | # of the BRS ports |
|---|---|---|---|
| [+1 +1 +1] | 00 | 1 subframe | 8 |
| [+1 $e^{j2\pi/3}$ $e^{j4\pi/3}$] | 01 | 2 subframe | 8 |
| [+1 $e^{j4\pi/3}$ $e^{j2\pi/3}$] | 10 | 4 subframes | 8 |

TABLE 16

| OCC (Length-4) | Beam period and BRS port configuration | # of subframes | # of the BRS ports |
|---|---|---|---|
| [+1 +1 +1 +1] | 00 | 1 subframe | 8 |
| [+1 −1 +1 −1] | 01 | 1 subframe | 4 |
| [+1 −1 −1 +1] | 10 | 2 subframes | 8 |
| [+1 +1 −1 −1] | 11 | 2 subframes | 4 |

TABLE 17

| OCC Index (Length-7) | Beam period and BRS port configuration | # of subframes | # of the BRS ports |
|---|---|---|---|
| OCC 0 | 000 | 1/2 subframe | 8 |
| OCC 1 | 001 | 1 subframe | 8 |
| OCC 2 | 010 | 1 subframe | 4 |
| OCC 3 | 011 | 2 subframes | 4 |
| OCC 4 | 100 | 2 subframes | 2 |
| OCC 5 | 101 | 4 subframes | 2 |
| OCC 6 | 110 | 4 subframes | 1 |

TABLE 18

| OCC Index (Length-7) | OCC (Length-7) |
|---|---|
| OCC 0 | [+1 +1 +1 +1 +1 +1 +1] |
| OCC 1 | [+1 $e^{j2\pi/7}$ $e^{j4\pi/7}$ $e^{j6\pi/7}$ $e^{j8\pi/7}$ $e^{j10\pi/7}$ $e^{j12\pi/7}$] |
| OCC 2 | [+1 $e^{j4\pi/7}$ $e^{j8\pi/7}$ $e^{j12\pi/7}$ $e^{j2\pi/7}$ $e^{j6\pi/7}$ $e^{j10\pi/7}$] |
| OCC 3 | [+1 $e^{j6\pi/7}$ $e^{j12\pi/7}$ $e^{j4\pi/7}$ $e^{j10\pi/7}$ $e^{j2\pi/7}$ $e^{j8\pi/7}$] |
| OCC 4 | [+1 $e^{j8\pi/7}$ $e^{j2\pi/7}$ $e^{j10\pi/7}$ $e^{j4\pi/7}$ $e^{j12\pi/7}$ $e^{j6\pi/7}$] |
| OCC 5 | [+1 $e^{j10\pi/7}$ $e^{j6\pi/7}$ $e^{j2\pi/7}$ $e^{j12\pi/7}$ $e^{j8\pi/7}$ $e^{j4\pi/7}$] |
| OCC 6 | [+1 $e^{j12\pi/7}$ $e^{j10\pi/7}$ $e^{j8\pi/7}$ $e^{j6\pi/7}$ $e^{j4\pi/7}$ $e^{j2\pi/7}$] |

The aforementioned embodiments, that is, Tables 12 to 18 show examples of the numbers of synchronization subframes and the numbers of BRS ports mapped to OCCs, beam periods and BRS port configurations.

A beam period and a BRS port configuration respectively refer to a beam period state and a BRS port state that can be represented by each OCC and can be mapped to various combinations of the number of synchronization subframes and the number of BRS ports which are not included in the aforementioned embodiments in addition to the aforementioned embodiments.

Sixth Embodiment

A sixth embodiment provides a method of using the aforementioned methods of the second embodiment and the fifth embodiment in a mixed manner.

That is, the methods of the second and fifth embodiments can be used in an independent or mixed manner.

The above-described embodiment of each proposal corresponds to an embodiment in which the method is independently used.

The following table 19 and equation 46 show an embodiment of transmitting beam period information and the number of BRS ports using method 3 of the second embodiment and method 1 of the fifth embodiment in a mixed manner.

TABLE 18

| Orthogonal cover code (Length-2) | Beam period configuration | # of subframes |
|---|---|---|
| [+1 +1] | 0 | 1 subframe |
| [+1 −1] | 1 | 2 subframes |

$$r_{l'}(k) = s_{c,p}(k) \times \tilde{r}_{l'}(k), k = 0, \ldots, N_{ESS} - 1, l' = \lfloor l/N_R \rfloor \quad \text{[Equation 46]}$$

$$c_{init} = 2^{10} \cdot (n_p + 1) \cdot (2 \cdot N_{cell} + 1) + 2 \cdot N_{cell} + i \quad \text{[Equation 47]}$$

$$\text{where } i = \begin{cases} 1 & \text{for 1st SS in one frame} \\ 0 & \text{for 2nd SS in one frame} \end{cases}$$

In Equation 46, $r_{l'}(k)$, $s_{c,p}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, BRS port configuration p and the k-th subcarrier, a sequence corresponding to the k-th subcarrier and the l'-th transmission among the $N_R$ repeated transmissions, a subcarrier index, an OFDM symbol index, the number of ESS subcarriers and the number of repeated transmissions, respectively.

In addition, in Equation 47, $n_p$, $N_{cell}$ and i represent a BRS port configuration index, a cell ID index and a synchronization subframe index, respectively.

The following table 20 and equation 47 show another embodiment of transmitting beam period information and the number of BRS ports using method 3 of the second embodiment and method 1 of the fifth embodiment in a mixed manner.

TABLE 20

| Orthogonal cover code (Length-2) | BRS port configuration | # of the BRS port |
|---|---|---|
| [+1 +1] | 0 | 4 |
| [+1 −1] | 1 | 8 |

$$r_{l'}(k) = s_{c,b}(k) \times \tilde{r}_{l'}(k), k = 0, \ldots, N_{ESS} - 1, l' = \lfloor l/N_R \rfloor \quad \text{[Equation 48]}$$

$$c_{init} = 2^{10} \cdot (n_b + 1) \cdot (2 \cdot N_{cell} + 1) + 2 \cdot N_{cell} + i \quad \text{[Equation 49]}$$

$$\text{where } i = \begin{cases} 1 & \text{for 1st SS in one frame} \\ 0 & \text{for 2nd SS in one frame} \end{cases}$$

In Equation 48, $r_{l'}(k)$, $s_{c,b}(k)$, $\tilde{r}_{l'}(k)$, k, l, $N_{ESS}$ and $N_R$ represent an ESS sequence corresponding to a k-th subcarrier and an l'-th transmission among $N_R$ repeated transmissions, a scrambling code corresponding to cell ID c, beam period configuration b and the k-th subcarrier, a sequence corresponding to the k-th subcarrier and the l'-th transmission among the $N_R$ repeated transmissions, a subcarrier index, an OFDM symbol index, the number of ESS subcarriers and the number of repeated transmissions, respectively.

In addition, in Equation 49, $n_b$, $N_{cell}$ and i represent a beam period configuration index, a cell ID index and a synchronization subframe index, respectively.

The aforementioned two embodiments represent examples provided in the sixth embodiment.

It is possible to use method 1 and method 2 of the fifth embodiment using OCCs having lengths of 3 and 4 mixed with the aforementioned embodiments.

Further, a beam period configuration and a BRS port configuration respectively refer to a beam period state and a BRS port state and can be mapped to various numbers of synchronization subframes and various numbers of BRS ports which are not included in the aforementioned embodiments in addition to the aforementioned embodiments.

In addition, a base station can transmit beam related information of a neighboring cell which is necessary for neighboring cell search to a terminal through a serving cell using RRC signaling in an additional embodiment proposed in the present disclosure.

Since base stations may have different beam periods, a terminal that intends to perform neighboring cell search needs to acquire beam related information about a neighboring cell, such as a beam period.

That is, when a terminal receives beam related information of a neighboring cell which is necessary for neighboring cell search through a base station, the terminal can reduce the amount of information allocated to synchronization signals or the number of processes such as PBCH decoding.

Hereinafter, specific formats by which a base station signals a beam period as beam related information of a neighboring cell to a terminal will be described with reference to Tables 21 and 22.

Table 21 shows an example of signaling, to a terminal, a beam period of a neighboring cell as a configuration value in the form of an offset on the basis of a beam period of a serving cell.

TABLE 21

| Offset configuration | Beam period configuration | example |
|---|---|---|
| 00 | Same configuration | Beam period configuration(serving cell): 01 |
| | | Beam period configuration(neighboring cell): 01 |
| 01 | One step lower configuration | Beam period configuration(serving cell): 01 |
| | | Beam period configuration(neighboring cell): 00 |
| 10 | One step higher configuration | Beam period configuration(serving cell): 01 |
| | | Beam period configuration(neighboring cell): 10 |
| 11 | Two step higher configuration | Beam period configuration(serving cell): 01 |
| | | Beam period configuration(neighboring cell): 11 |

That is, a base station can compare a beam period of a serving cell with a beam period of a neighboring cell and signal "offset configuration" suitable for each neighboring cell along with neighboring cell information to a terminal, as shown in the examples of Table 21.

The following table 22 shows an example in which a base station signals, to a terminal, a configuration value representing a beam period value of a neighboring cell.

That is, the base station can transmit a "beam period configuration" value with respect to a neighboring cell to the terminal through RRC signaling, as shown in the examples of Table 22.

Similarly, the base station can transmit beam period configuration information about a neighboring cell of the terminal, as shown in the examples of Table 22, to the terminal along with neighboring cell information.

TABLE 22

| Beam period configuration | # of subframes | Beam period | Maximum Number of beam scanning |
|---|---|---|---|
| 00 | 1/2 subframe | 5 ms or <5 ms | $N_P \times N_{sym}$ |
| 01 | 1 subframe | 5 ms | $2 \times N_P \times N_{sym}$ |
| 10 | 2 subframes | 10 ms | $4 \times N_P \times N_{sym}$ |
| 11 | 4 subframes | 20 ms | $8 \times N_P \times N_{sym}$ |

In the aforementioned additional embodiment, it is assumed that a plurality of beams of cells (a serving cell and a neighboring cell) have the same beam period.

For example, beam #1 and beam #2 in the same cell can be repeated in the same period.

Here, the beam period of the beams refer to a beam period for a periodic synchronization signal.

A beam period with respect to a beam through which data is transmitted may differ from the above-described beam period for synchronization.

That is, beams through which data is transmitted may have different beam periods.

Here, a base station may signal a beam period with respect to a beam through which data is transmitted to a specific terminal through a control channel or the like.

Figure 13:
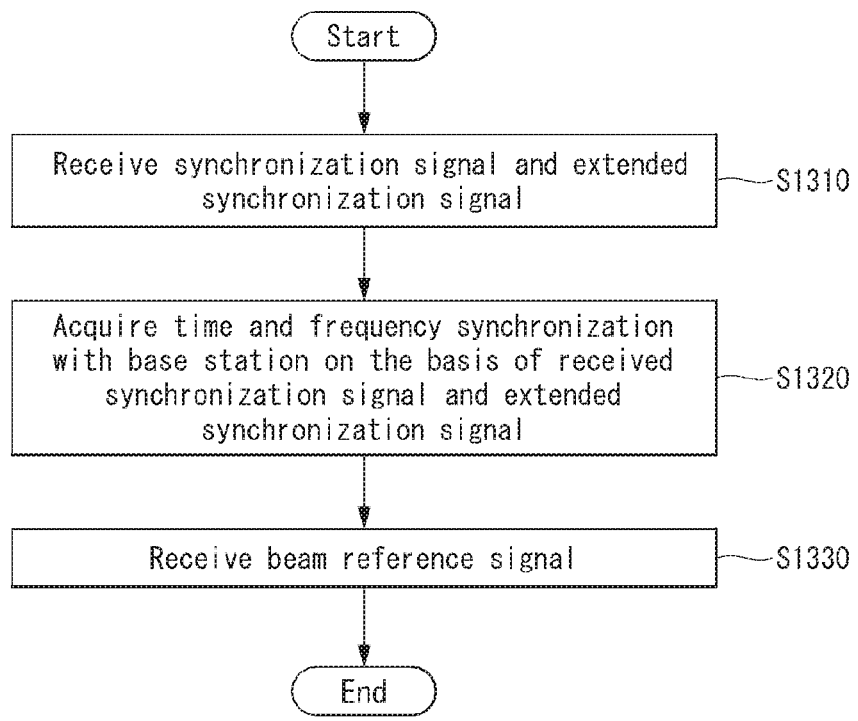
FIG. 13 is a flowchart showing an example of a method for transmitting and receiving an extended synchronization signal proposed in the present disclosure.

FIG. 13 is a flowchart showing an example of a method for transmitting and receiving an extended synchronization signal proposed in the present disclosure.

First, a terminal receives, from a base station, a synchronization signal and an extended synchronization signal which are repeatedly transmitted a predetermined number of times for each beam (S1310).

Here, the synchronization signal includes a primary synchronization signal (PSS) and a secondary synchronization signal. The extended synchronization signal includes positional information of a symbol in a subframe.

Sequences of the extended synchronization signal are generated using at least one of a scrambling code generated on the basis of a pseudo-random sequence and an orthogonal cover code (OCC).

The pseudo-random sequence may be generated from a length-31 Gold sequence.

Further, the scrambling code or the OCC may be determined on the basis of at least one of a physical cell identifier (PCI), a beam period and the number of ports of a BRS.

Further, the sequences of the extended synchronization signal include a first extended synchronization signal sequence and a second extended synchronization signal sequence, and the first extended synchronization signal sequence and the second extended synchronization signal sequence may be determined differently.

Here, the first extended synchronization signal sequence may be an odd-numbered sequence of the sequences of the extended synchronization signal and the second extended synchronization signal sequence may be an even-numbered sequence of the sequences of the extended synchronization signal The synchronization signal and the extended synchronization signal may be transmitted through two subframes in one radio frame and may be transmitted in all symbols of each subframe.

The two subframes in one radio frame may be a first subframe of a first slot and a first subframe of a second slot.

The BRS may be transmitted on the basis of a beam period.

The subframe may be 0.2 ms.

Subsequently, the terminal acquires time and frequency synchronization with the base station on the basis of the received synchronization signal and extended synchronization signal (S1320).

Thereafter, the terminal receives a beam reference signal related to beam selection from the base station (S1330).

Additionally, the terminal may select an optimal beam on the basis of the received BRS and transmit/receive signals to/from the base station through the selected beam.

Additionally, the base station may transmit beam related information of a neighboring cell which is necessary for neighboring cell search of the terminal through a serving cell through RRC signaling.

The beam related information may include beam period information.

Further, beam periods with respect to a plurality of beams within the same cell may be identical when a periodic synchronization is transmitted and may be different when data is transmitted.

When beam periods with respect to a plurality of beams are different, the base station may signal the beam periods to the terminal through a control channel such as a PDCCH.

Apparatus to which the Present Invention is Applicable

Figure 14:
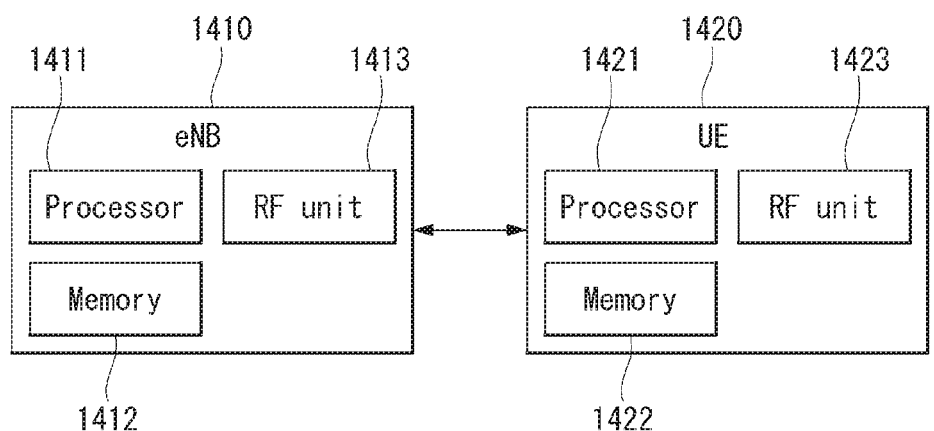
FIG. 14 is a block diagram of a wireless communication apparatus to which the present invention is applicable.

FIG. 14 is a block diagram of a wireless communication apparatus according to an embodiment of the present invention.

Referring to FIG. 14, the wireless communication apparatus includes a base station 1410 and a plurality of terminals 1420 located within the coverage of the base station 1410.

The base station 1410 includes a processor 1411, a memory 1412 and a radio frequency (RF) unit 1413. The processor 1411 realizes the aforementioned functions, processes and/or methods proposed in FIGS. 1 to 13. Layers of a wireless interface protocol can be realized by the processor 1411. The memory 1412 is connected to the processor 1411 and stores various types of information for driving the processor 1411. The RF unit 1413 is connected to the processor 1411 and transmits and/or receives RF signals.

The terminal 1420 includes a processor 1421, a memory 1422 and an RF unit 1423. The processor 1421 realizes the aforementioned functions, processes and/or methods proposed in FIGS. 1 to 13. Layers of a wireless interface protocol can be realized by the processor 1421. The memory 1422 is connected to the processor 1421 and stores various types of information for driving the processor 1421. The RF unit 1423 is connected to the processor 1421 and transmits and/or receives RF signals.

The memories 1412 and 1422 may be provided inside or outside the processors 1411 and 1421 and may be connected to the processors 1411 and 1421 through various known means.

In addition, the base station 1410 and/or the terminal 1420 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the present invention has been described on the basis of examples applied to 3GPP system and 5G system, the present invention can also be applied to various wireless communication systems.

What is claimed is:

1. A method for transmitting and receiving, by a terminal, synchronization signals in a wireless communication system, the method comprising:
   receiving, from a base station, the synchronization signals and an extended synchronization signal which are repeatedly transmitted a predetermined number of times for each beam,
   wherein the synchronization signals include a primary synchronization signal (PSS) and a secondary synchronization signal, and
   wherein the extended synchronization signal includes positional information of a symbol in a subframe;
   acquiring time and frequency synchronization with the base station based on the synchronization signals and the extended synchronization signal; and
   receiving, from the base station, a beam reference signal (BRS) related to beam selection.

2. The method according to claim 1, wherein sequences of the extended synchronization signal are generated using at least one of a scrambling code generated on the basis of a pseudo-random sequence and an orthogonal cover code (OCC).

3. The method according to claim 2, wherein the pseudo-random sequence is generated from a length-31 Gold sequence.

4. The method according to claim 2, wherein the scrambling code or the OCC is determined on the basis of at least one of a physical cell identifier (PCI), a beam period and the number of ports of the BRS.

5. The method according to claim 2, wherein the sequences of the extended synchronization signal include a first extended synchronization signal sequence and a second extended synchronization signal sequence, the first extended synchronization signal sequence and the second extended synchronization signal sequence being determined differently.

6. The method according to claim 5, wherein the first extended synchronization signal sequence is an odd-numbered sequence of the sequences of the extended synchronization signal and the second extended synchronization signal sequence is an even-numbered sequence of the sequences of the extended synchronization signal.

7. The method according to claim 1, wherein the synchronization signals and the extended synchronization signal are transmitted through two subframes in one radio frame and transmitted in all symbols of each subframe.

8. The method according to claim 7, wherein the two subframes in one radio frame are a first subframe of a first slot and a first subframe of a second slot.

9. The method according to claim 1, wherein the BRS is transmitted on the basis of a beam period.

10. The method according to claim 1, wherein the subframe is 0.2 ms.

11. A terminal for transmitting and receiving synchronization signals in a wireless communication system, the terminal comprising:
    a radio frequency (RF) unit for transmitting and receiving RF signals; and
    a processor for controlling the RF unit,
    wherein the processor is configured to:
    receive, from a base station, the synchronization signals and an extended synchronization signal which are repeatedly transmitted a predetermined number of times for each beam,
    wherein the synchronization signals include a primary synchronization signal (PSS) and a secondary synchronization signal, and
    wherein the extended synchronization signal includes positional information of a symbol in a subframe;
    acquire time and frequency synchronization with the base station based on the synchronization signals and the extended synchronization signal; and
    receive from the base station, a beam reference signal (BRS) related to beam selection.

12. The terminal according to claim 11, wherein sequences of the extended synchronization signal are generated using at least one of a scrambling code generated on the basis of a pseudo-random sequence and an orthogonal cover code (OCC).

13. The terminal according to claim 12, wherein the pseudo-random sequence is generated from a length-31 Gold sequence.

14. The terminal according to claim 12, wherein the scrambling code or the OCC is determined on the basis of at least one of a physical cell identifier (PCI), a beam period and the number of ports of the BRS.

15. The terminal according to claim 12, wherein the sequences of the extended synchronization signal include a first extended synchronization signal sequence and a second extended synchronization signal sequence, the first extended synchronization signal sequence and the second extended synchronization signal sequence being determined differently.

16. The method according to claim 1, further comprising receiving, from the base station, beam related information of a neighboring cell necessary for neighboring cell search through a serving cell.

17. The method according to claim 16, wherein the beam related information includes beam period information,
   wherein the beam period information of the neighboring cell is set to an offset from a beam period of the serving cell or set to a value directly indicating a beam period of the neighboring cell.

18. The method according to claim 17, wherein periods for beams of the serving cell or the neighboring cell are identical to each other in the case of periodic synchronization signal transmission and different from each other in the case of data transmission.

* * * * *